(12) United States Patent
Rafferty et al.

(10) Patent No.: US 11,186,338 B2
(45) Date of Patent: Nov. 30, 2021

(54) REMOTE CONTROL SYSTEM FOR COMFORT-MANAGEMENT DEVICE(S)

(71) Applicant: Polaris Industries Inc., Medina, MN (US)

(72) Inventors: Michael W. Rafferty, New Brighton, MN (US); Scott M. Schwintek, St. Anthony, MN (US); Kent A. Underland, Willmar, MN (US); Trevor A. Carlson, Minneapolis, MN (US); Joel M. Notaro, Chisago City, MN (US)

(73) Assignee: Polaris Industries Inc., Medina, MN (US)

( * ) Notice: Subject to any disclaimer, the term of this patent is extended or adjusted under 35 U.S.C. 154(b) by 51 days.

(21) Appl. No.: 16/735,077

(22) Filed: Jan. 6, 2020

(65) Prior Publication Data

US 2020/0216133 A1    Jul. 9, 2020

Related U.S. Application Data

(63) Continuation-in-part of application No. 16/106,081, filed on Aug. 21, 2018.
(Continued)

(51) Int. Cl.
*B62J 45/40*    (2020.01)
*B60N 2/56*    (2006.01)
(Continued)

(52) U.S. Cl.
CPC .............. *B62J 45/20* (2020.02); *B60N 2/565* (2013.01); *B62J 1/08* (2013.01); *B62J 1/18* (2013.01); *B62J 45/40* (2020.02)

(58) Field of Classification Search
CPC ........ B60N 2/565; B60N 2/56; B60N 2/5657; B62J 45/40
See application file for complete search history.

(56) References Cited

U.S. PATENT DOCUMENTS

| 1,011,574 A | 12/1911 | Carron |
| 5,934,748 A * | 8/1999 | Faust .................. B60N 2/5635 |
| | | 297/180.12 |

(Continued)

FOREIGN PATENT DOCUMENTS

JP    2016-124397 A    7/2016

OTHER PUBLICATIONS

International Search Report for International Application PCT/US2018/047978; dated Dec. 12, 2018.
(Continued)

*Primary Examiner* — Timothy J Brindley
(74) *Attorney, Agent, or Firm* — Harness, Dickey & Pierce, P.L.C.

(57) ABSTRACT

A seat assembly for a vehicle having a longitudinal axis has a seat pan, a cover support adjacent to the seat pan and a seat cover comprising an upper surface and a first longitudinally extending side surface and a second longitudinally extending side surface. A heating and cooling module is disposed at least partially within the cover support. An air inlet is in communication with the heating and cooling module. The air inlet communicates air from a port in the seat cover to the heating and cooling module. An ambient condition sensor generates an ambient condition signal. A user interface generates a user setting corresponding to a comfort condition. A controller is coupled to the ambient condition sensor and the heating and cooling module. The controller controls the heating and cooling module in response to the user setting and the ambient condition signal.

18 Claims, 28 Drawing Sheets

Related U.S. Application Data

(60) Provisional application No. 62/549,665, filed on Aug. 24, 2017.

(51) Int. Cl.
  B62J 45/20 (2020.01)
  B62J 1/08 (2006.01)
  B62J 1/18 (2006.01)

(56) References Cited

U.S. PATENT DOCUMENTS

| | | | |
|---|---|---|---|
| 7,708,626 B2 * | 5/2010 | Bargheer | B60N 2/5685 |
| | | | 454/120 |
| 9,550,541 B2 | 1/2017 | Lenten et al. | |
| 9,662,962 B2 * | 5/2017 | Steinman | B60H 1/00064 |
| 2002/0057005 A1 * | 5/2002 | Bargheer | B60N 2/5657 |
| | | | 297/180.13 |
| 2006/0130490 A1 * | 6/2006 | Petrovski | B60N 2/5642 |
| | | | 62/3.3 |
| 2006/0219686 A1 | 10/2006 | Oishi et al. | |
| 2006/0279113 A1 | 12/2006 | Pautz | |
| 2007/0257541 A1 | 11/2007 | Browne et al. | |
| 2009/0242539 A1 | 10/2009 | Wassel | |
| 2010/0314191 A1 | 12/2010 | Deckard et al. | |
| 2012/0144844 A1 | 6/2012 | Park et al. | |
| 2013/0232996 A1 * | 9/2013 | Goenka | B60N 2/56 |
| | | | 62/3.61 |
| 2014/0327320 A1 | 11/2014 | Muhs et al. | |
| 2015/0274049 A1 * | 10/2015 | Langensiepen | B60N 2/5642 |
| | | | 297/180.12 |
| 2015/0318732 A1 | 11/2015 | Heine et al. | |
| 2016/0304013 A1 * | 10/2016 | Wolas | B60N 2/5657 |
| 2016/0318468 A1 * | 11/2016 | Ricci | G01S 19/42 |
| 2016/0332549 A1 * | 11/2016 | Marquette | B60N 2/5635 |
| 2016/0347218 A1 | 12/2016 | Akaike et al. | |
| 2017/0094727 A1 | 3/2017 | Saunamaki | |
| 2017/0341549 A1 * | 11/2017 | Da Costa | A61B 5/6893 |
| 2018/0216780 A1 | 8/2018 | Oltmans | |
| 2019/0047449 A1 * | 2/2019 | Fujii | B60N 2/5657 |
| 2019/0289929 A1 | 9/2019 | Bessette et al. | |
| 2019/0344043 A1 * | 11/2019 | Migneco | B60N 2/0244 |
| 2019/0366799 A1 * | 12/2019 | Czerwonka | B60H 1/00478 |
| 2020/0093635 A1 * | 3/2020 | Kakizaki | B60N 2/5678 |
| 2020/0108753 A1 * | 4/2020 | Fujii | B60N 2/5657 |
| 2020/0122613 A1 * | 4/2020 | McElroy | B60N 2/565 |
| 2020/0223292 A1 * | 7/2020 | Kazyak | B60N 2/56 |
| 2021/0039791 A1 * | 2/2021 | Wilson | B60N 2/5628 |
| 2021/0102733 A1 * | 4/2021 | Stahl | B60N 2/5657 |

OTHER PUBLICATIONS

U.S. Appl. No. 16/106,081, filed Aug. 21, 2018, Schwintek et al.
U.S. Appl. No. 16/734,846, filed Jan. 6, 2020, Fuchs et al.

* cited by examiner

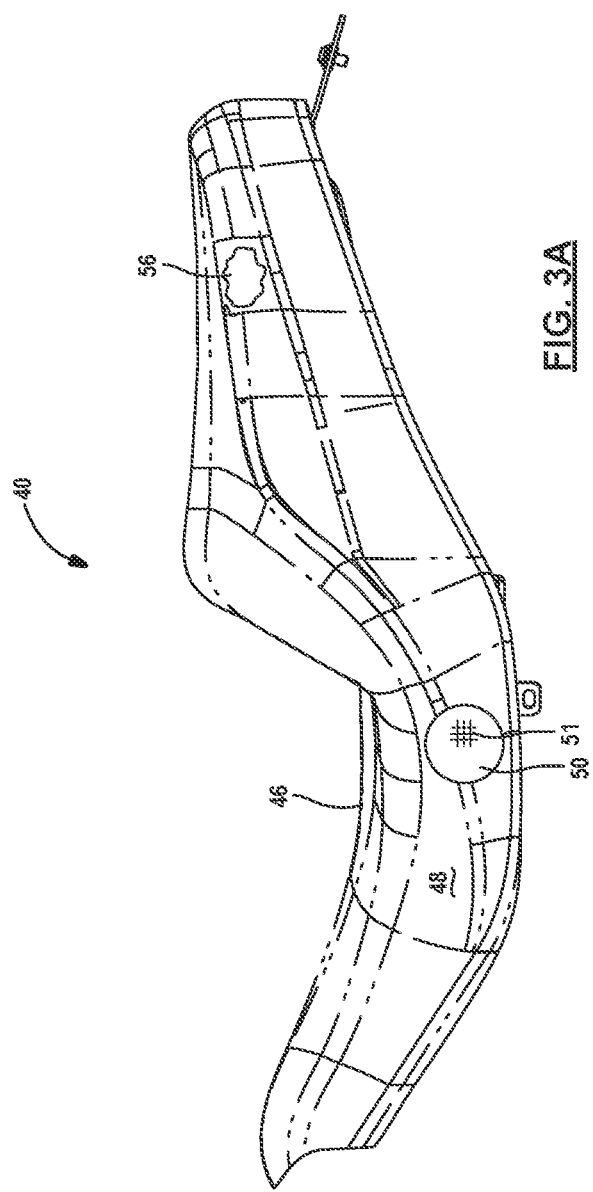

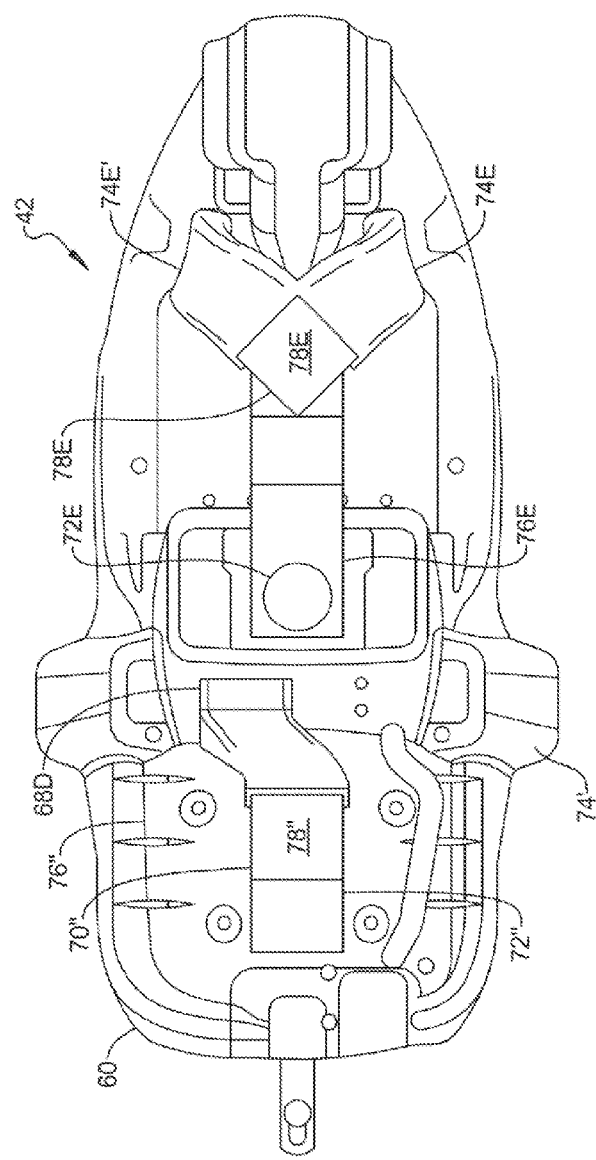

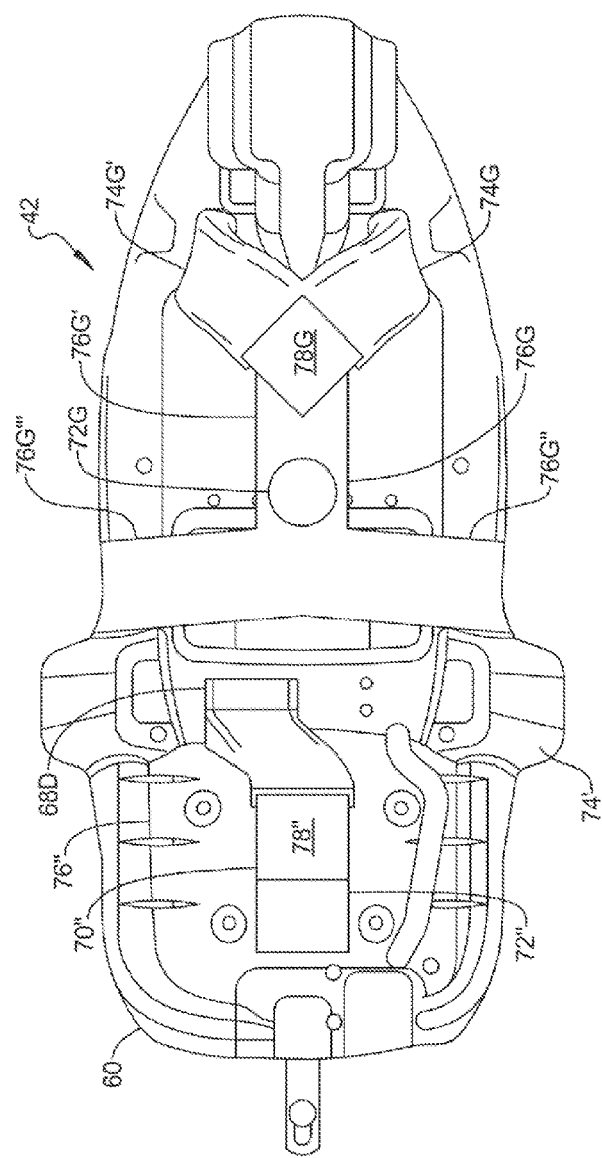

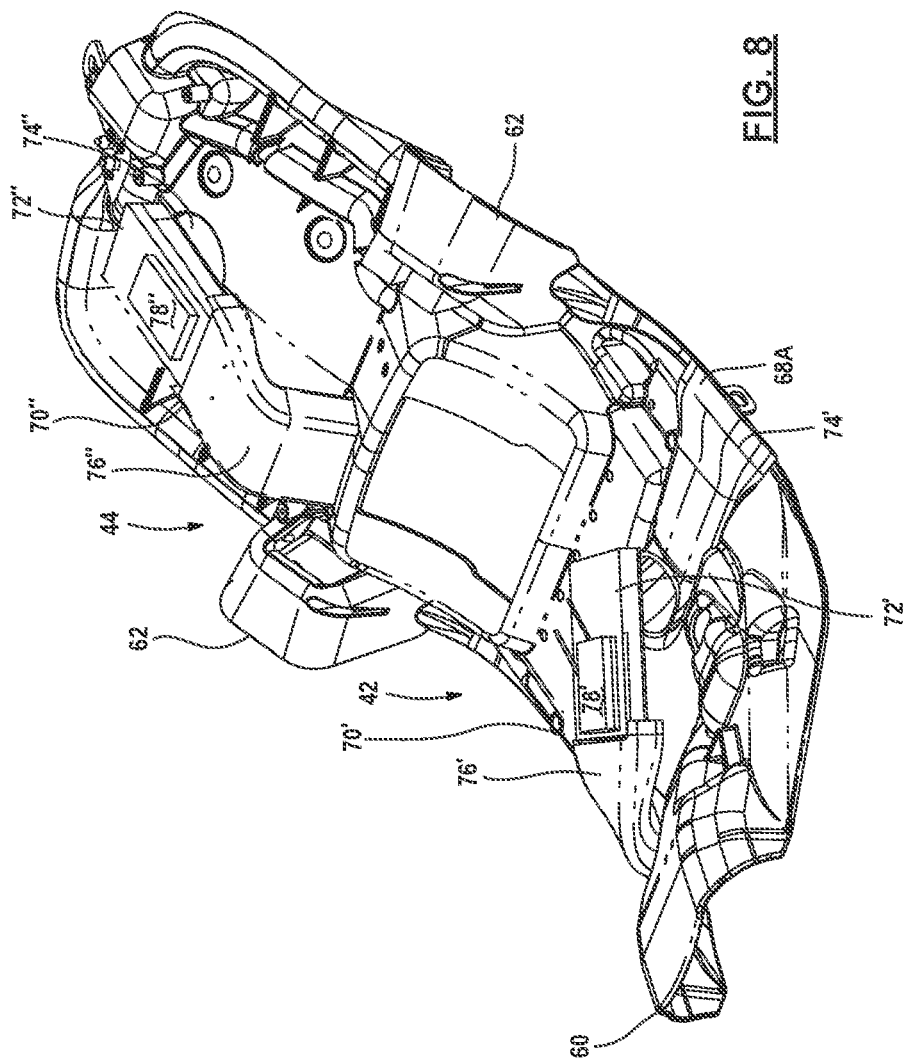

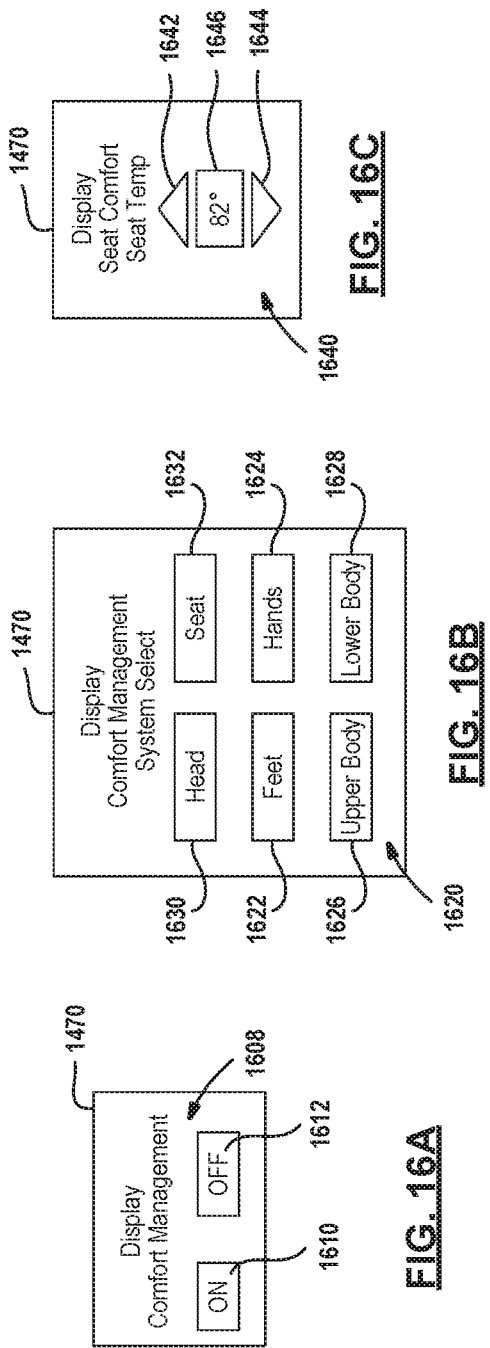
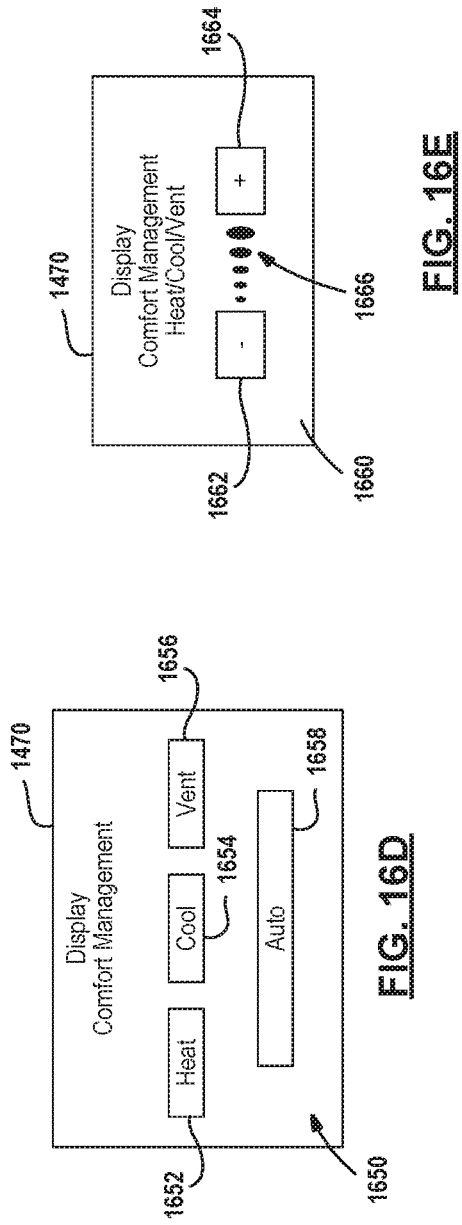

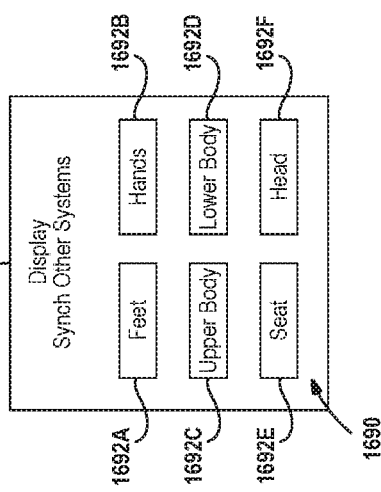
FIG. 16G
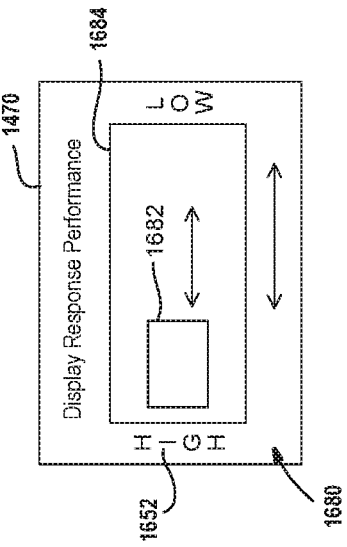
FIG. 16F
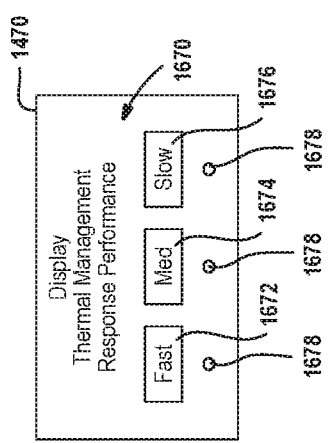
FIG. 16H
FIG. 16I

REMOTE CONTROL SYSTEM FOR COMFORT-MANAGEMENT DEVICE(S)

CROSS-REFERENCE TO RELATED APPLICATIONS

This application is related to U.S. application Ser. No. 16/734,846 filed Jan. 6, 2020, and is a continuation in part of U.S. application Ser. No. 16/106,081 filed Aug. 21, 2018, which claims the benefit of U.S. Provisional Application No. 62/549,665 filed on Aug. 24, 2017. The entire disclosure of the above application is incorporated herein by reference.

FIELD

The present disclosure relates to a seat for a vehicle and, more particularly, to a heated and cooled seat.

BACKGROUND

This section provides background information related to the present disclosure which is not necessarily prior art.

Providing a comfortable seat for a vehicle has been a goal for vehicle providers for years. Innovations such as heated and cooled seats have made driving vehicles more comfortable. A typical automotive cooled seat draws air into the heated and cooled seat from under the seat. Open-air vehicles such as a motorcycle generate a large amount of heat close to the occupant and specifically under the seat. With an engine so close to the rider, air from under the seat is at a relatively high temperature and not suitable for cooling the seat.

One undesirable feature of heated and locked seats, particularly with open air vehicles, is the lack of adjustment or compensation during operation in changing conditions.

SUMMARY

This section provides a general summary of the disclosure, and is not a comprehensive disclosure of its full scope or all of its features.

The present disclosure provides an improved heating and cooling configuration for a vehicle seat or seats. While the system is suitable for various types of automotive vehicles, the configuration set forth herein provides a configuration particularly suitable for motorcycles and open air vehicles.

In one aspect of the disclosure, a seat assembly for a vehicle having a longitudinal axis has a seat pan, a cover support adjacent to the seat pan and a seat cover comprising an upper surface and a first longitudinally extending side surface and a second longitudinally extending side surface. A heating and cooling module is disposed at least partially within the cover support. An air inlet is in communication with the heating and cooling module. The air inlet communicates air from a port in the seat cover to the heating and cooling module. An ambient condition sensor generates an ambient condition signal. A user interface generates a user setting corresponding to a comfort condition. A controller is coupled to the ambient condition sensor and the heating and cooling module. The controller controls the heating and cooling module in response to the user setting and the ambient condition signal.

In a further aspect of the disclosure, method of controlling a seat includes generating ambient condition signal from an ambient condition sensor, generating an occupant condition signal from an occupant condition sensor, generating a user setting corresponding to a comfort condition at a user interface, and controlling a heating and cooling module in response to the user setting and the ambient condition signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3A is a left side view of a seat according to the present disclosure;

FIG. 7E is a fourth alternate top view of the seat pan having a passenger heating and cooling module and a driver heating and cooling module;

FIG. 7G is a sixth alternate top view of the seat pan having a passenger heating and cooling module and a driver heating and cooling module;

FIG. 8 is a perspective view of the seat pan having a passenger heating and cooling module and a driver heating and cooling module;

FIGS. 16A-16I are screen displays of various screens in the control of the comfort management system.

Corresponding reference numerals indicate corresponding parts throughout the several views of the drawings.

DETAILED DESCRIPTION

Example embodiments will now be described more fully with reference to the accompanying drawings. Although the following description includes several examples of a motorcycle application, it is understood that the features herein may be applied to any appropriate vehicle, such as snowmobiles, all-terrain vehicles, utility vehicles, moped and scooters. The embodiments disclosed below are not intended to be exhaustive or to limit the invention to the precise forms disclosed in the following detailed description. Rather, the embodiments are chosen and described so that others skilled in the art may utilize their teachings.

Figure 1:
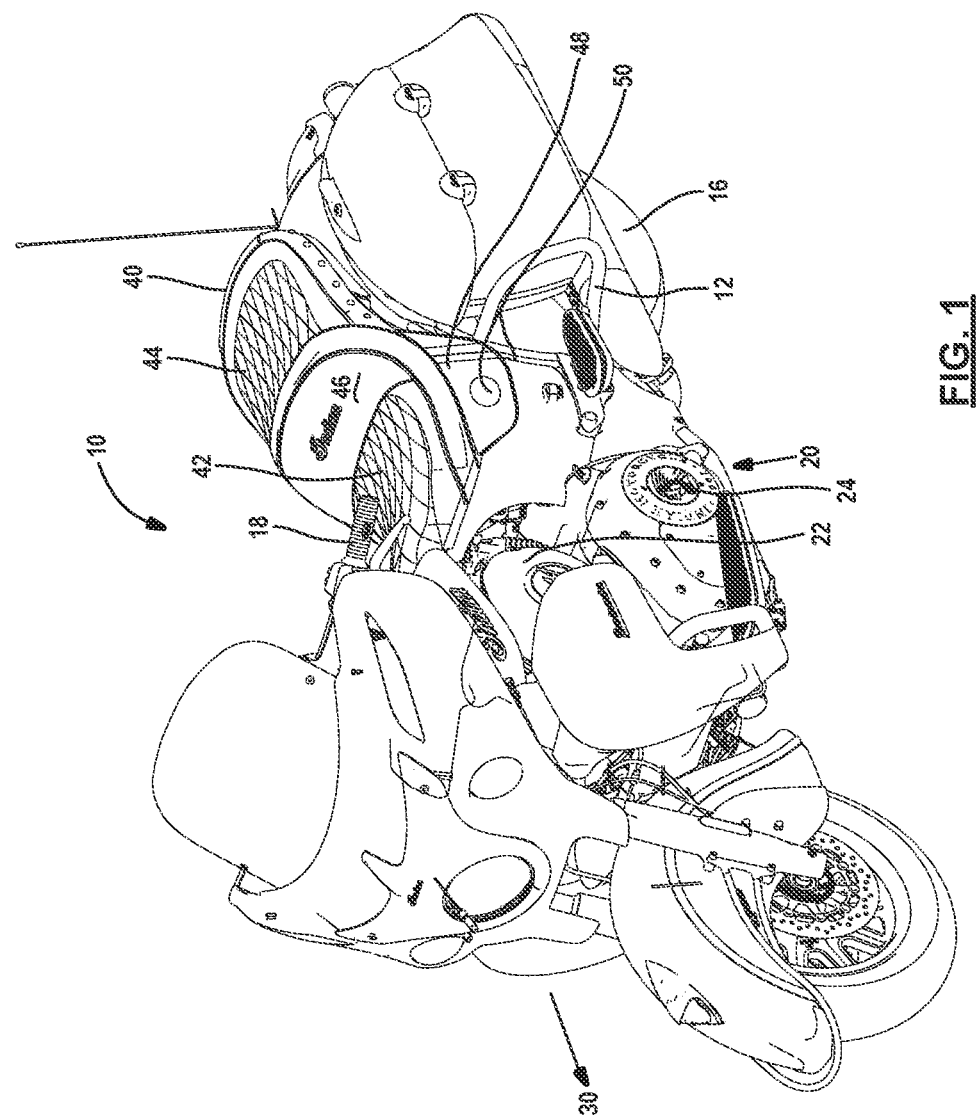
FIG. 1 is a perspective view of the cool side of the vehicle.
Figure 2:
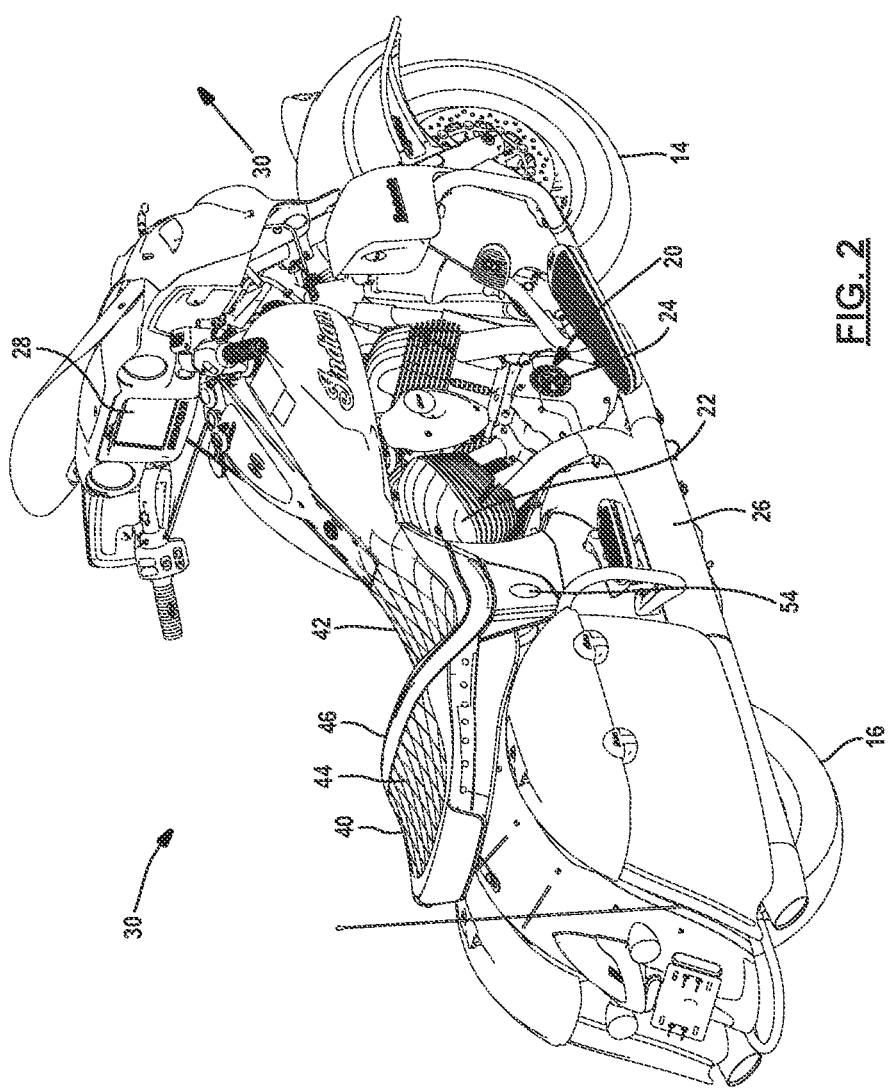
FIG. 2 is a perspective view showing the heated side of the vehicle.

Referring now to FIGS. 1 and 2, a vehicle 10 is illustrated. The vehicle 10 in this example is a two-wheeled vehicle. The two-wheeled vehicle 10 illustrated is a touring style motorcycle. However, the present example is also applicable to other types of vehicles including snowmobiles, scooters, utility vehicles, off-road vehicles and side-by-side vehicles that accommodate passengers in a one of many seating positions The vehicle 10 includes a frame 12 that is used to support the vehicle components including wheels 14 and 16. Wheel 14 is a front wheel which is coupled to the handlebars 18 for by way of a first fork for steering. The rear wheel 16 is a coupled to a powertrain assembly 20 that is used to provide the rotational force to the rear wheel 16, in this example. Of course, all of the wheels on a vehicle or a selected few of the wheels may be coupled to the powertrain assembly 20. The powertrain assembly 20 includes an engine 22 and transmission 24. The powertrain assembly 20 may also include an exhaust pipe 26 that removes waste exhaust from the engine 22. The waste exhaust is at a relatively high temperature compared to the ambient temperatures through which vehicles typically travel. Because the exhaust pipe 26 extends from the engine 22, as is best illustrated in FIG. 2, the right side of the vehicle, in this example, is referred to as the heated side of the vehicle. In FIG. 1, by contrast, there is no exhaust pipe extending from the left side of the engine 22 and therefore the left side of the vehicle in this example is referred to as the cooled side of the vehicle. Note that the exhaust configuration may include exhaust pipes on both sides and/or under the engine 22.

A display panel 28 may be used to provide various information to the driver of the vehicle. The display panel 28 may include a touch screen that provides various user interface for various functions. The display panel 28 in relation to a seating configuration is described in further detail below.

The vehicle 10 also has a longitudinal axis 30 that extends in the direction of forward travel of the vehicle 10 that extends from the front wheel 14 to the rear wheel 16.

The frame 12 may also be used to support a seat assembly 40. The seat assembly 40 can include a driver seating position 42 and a passenger seating position 44. In this example, the driver seating position 42 and the passenger seating position 44 are part of a unitary construction of the seat assembly 40 in which the passenger seating position 44 is higher (relative to the road during driving) than the driver seating position. In other types of vehicles, the driver position 42 and the passenger position 44 may be separated into two separate seats. Alternately, there may be only a single driver seat.

Figure 3B:
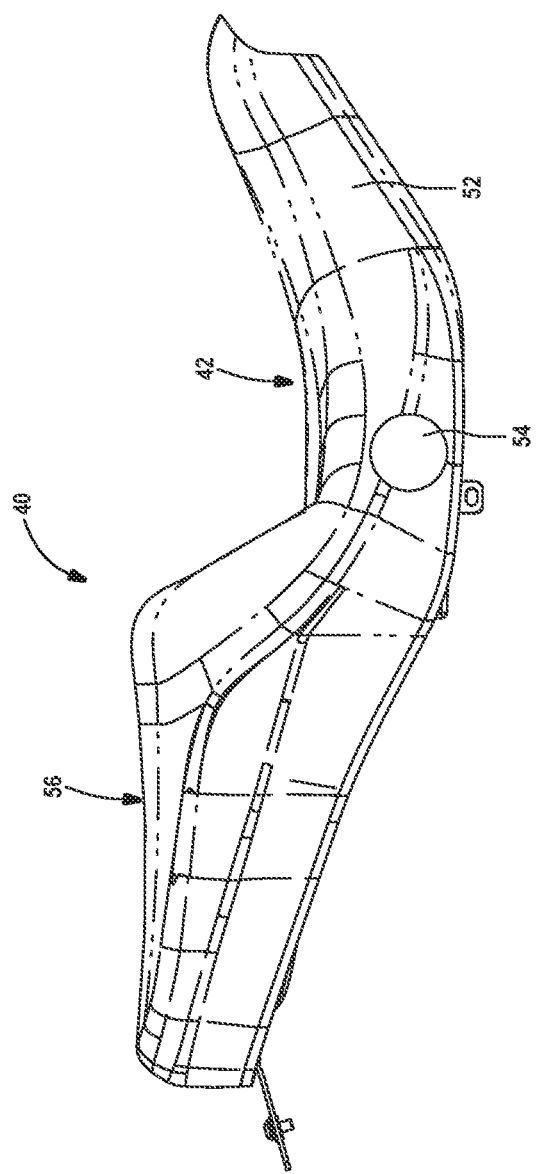
FIG. 3B is a right side view of the seat of FIG. 3A.

Referring now additionally to FIGS. 3A and 3B, the seat assembly 40 is illustrated in further detail. FIG. 3A shows a side view of the seat assembly 40. FIGS. 3A and 3B illustrate the seat cover 46 that has a first longitudinally extending side 48 corresponding to a first longitudinally extending side of the seat assembly 40. The first side 48 extends in a generally in a vertical plane of the vehicles and generally perpendicular to the road plane when the vehicle is in an upright position. An inlet port 50 is disposed within the first longitudinally extending side 48 of the cover 46. The port 50 may provide an opening so that air may be drawn into a heating and cooling system as will be described in further detail below. The port 50 may have a covering that is formed of a hydrophobic mesh material 51 to reduce an amount of water entering the port 50.

A second longitudinally extending side 52 on the opposite side of the seat from the first longitudinally extending side 48 may have a port 54. The port 54 may be blank or filled in if no seat air exhaust is required on that side of the vehicle. The port 54 may be used for exhausting air from the seat assembly 40.

Within the seat cover 46, a cover support 56 such as a cushion is formed from a foam material. The cover support 56 is used for supporting a driver and a passenger and may be used for housing the heating and cooling module as described below.

Figure 4:
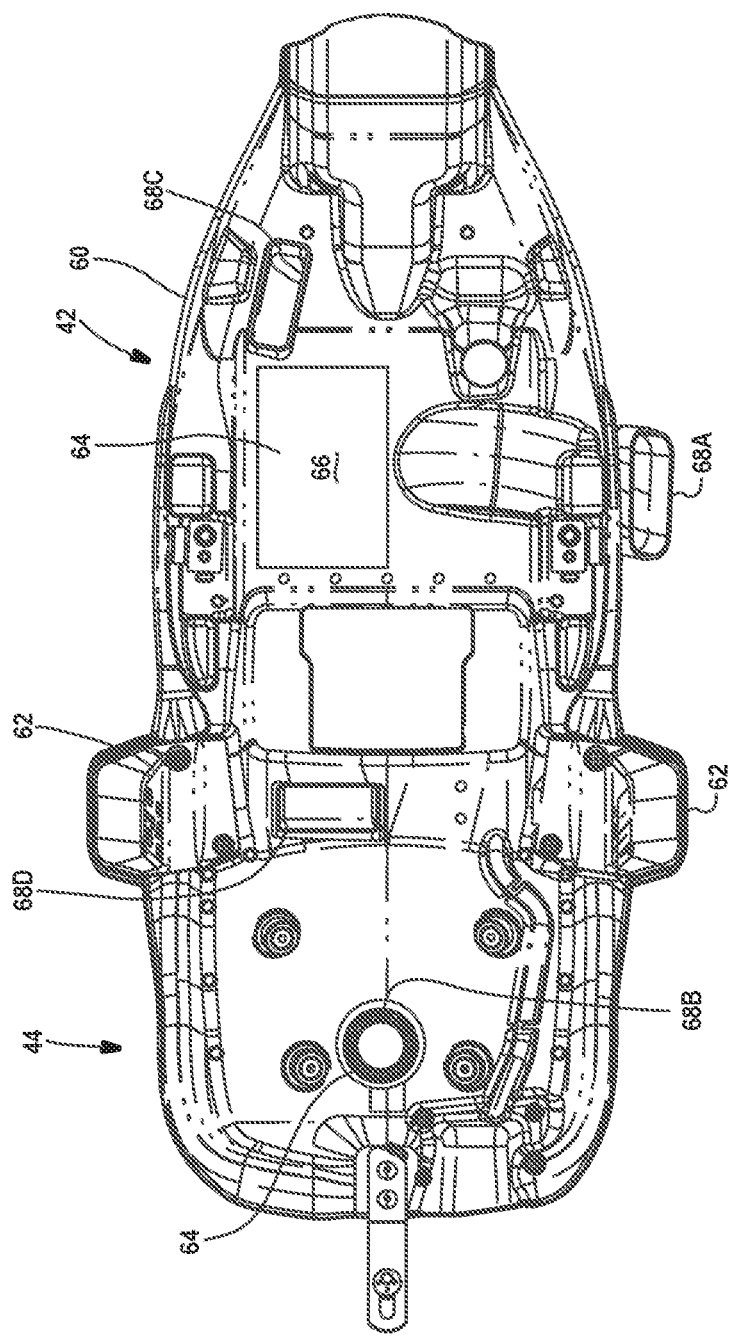
FIG. 4 is a bottom view of a seat pan.

Referring now to FIG. 4, a seat pan 60 is shaped to support the cover support 56 and the cover 46. The seat pan 60 is used for mounting the seat assembly to the frame 12. The seat pan 60 includes bezel openings 62. Bezel openings 62 may be included on one or both sides of the seat pan 60. The bezel opening 62 may be used for a switch control bezel. If switch controls are not used in the seat assembly 40, then the bezel opening 62 may be eliminated or filled with a blank panel.

The seat pan 60 may also include a service opening 64 filled by a removable service panel 66. The location of the service opening 64 is sized to allow a service technician to remove and replace the entire heating and cooling module or components of the heating and cooling module. These components may include a fan, a heat exchanger or ducts as will be described below.

The seat pan 60 may also include an air inlet ports 68A, 68B and air outlet ports 68C, 68D. The air inlet port 68A and air outlet port 68C of the seat pan 60 correspond to the driver position 42. The air inlet port 68B and the air outlet port 68D correspond to the passenger position 44.

Figure 5A:
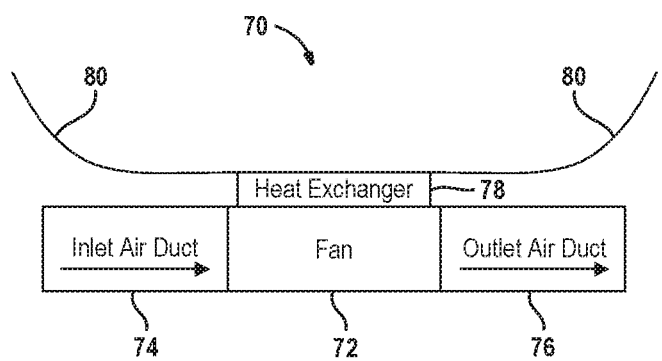
FIG. 5A is a block diagrammatic view of a heating and cooling module.

Referring now to FIG. 5A, the heating and cooling module 70 includes a fan 72 that is in communication with an air inlet such as an inlet air duct 74 and an air outlet such as an outlet air duct 76. The air inlet and air outlet may have a discrete duct or may be a passage in the seat pan or seat support or cushion. In this example, the fan 72 is coupled to a heat exchanger 78. The heat exchanger 78 is in thermal communication with one or more heating elements 80. The heat exchanger 78 can remove heat from the heating elements 80 and remove the waste heat through the air travelling through the inlet air duct 74, the fan 72 and the outlet air duct 76. The system may also operate in a thermally reversed manner in which the heat contained within the air of the inlet air duct 74 may be removed using the heat exchanger 78 so that that the heating elements 80 is cooled.

The heating module 70 may use liquid or thin film technology. For example, the heating elements 80 may be formed from a thermally conductive material such as graphene or carbon nanotubes. The heating elements 80 may be located between the cover support 56 and the cover 46 described above in FIGS. 3A and 3B. Foam or other material may be disposed between the cover and the heating elements 80 to hide the feel or look of the heating element. The heating element 80 may be a flexible material to conform to the shape of the seat assembly 40 and seat cover 46, or both during operation and during inactive times.

Figure 5B:
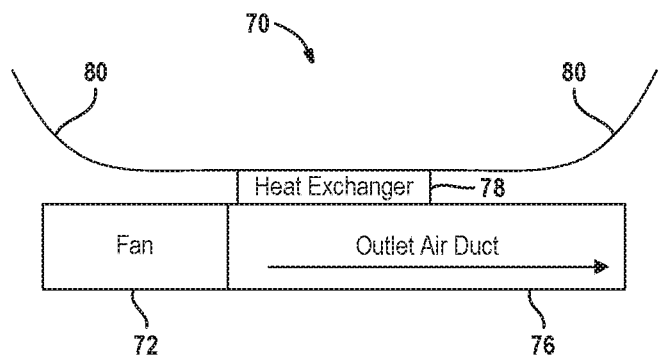
FIG. 5B is a block diagrammatic view of a second example of the heating and cooling module without an inlet air duct.

In FIG. 5B, the inlet air duct of FIG. 5A has been removed. In this case the fan 72 may be placed directly adjacent to the inlet port 50 of the seat cover 46 without a corresponding inlet air duct. The heat exchanger 78 and the fan 72 may be separated in any example including those with both inlet and outlet air ducts.

Figure 5C:
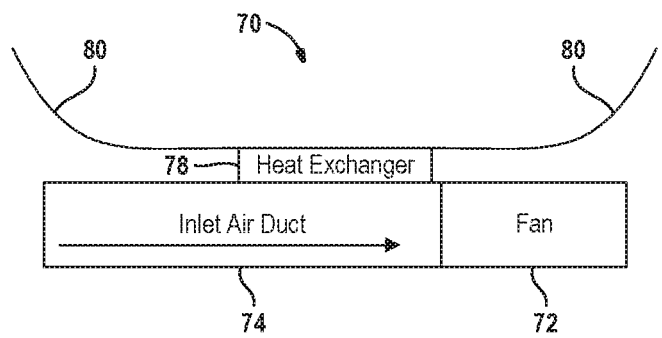
FIG. 5C is a block diagrammatic view of a second example of the heating and cooling module without an outlet air duct.

In FIG. 5C the outlet air duct of FIG. 5A has been removed. In this case the fan 72 may be placed directly adjacent to outlet port in the seat cover or seat pan for exhausting air.

Figure 6:
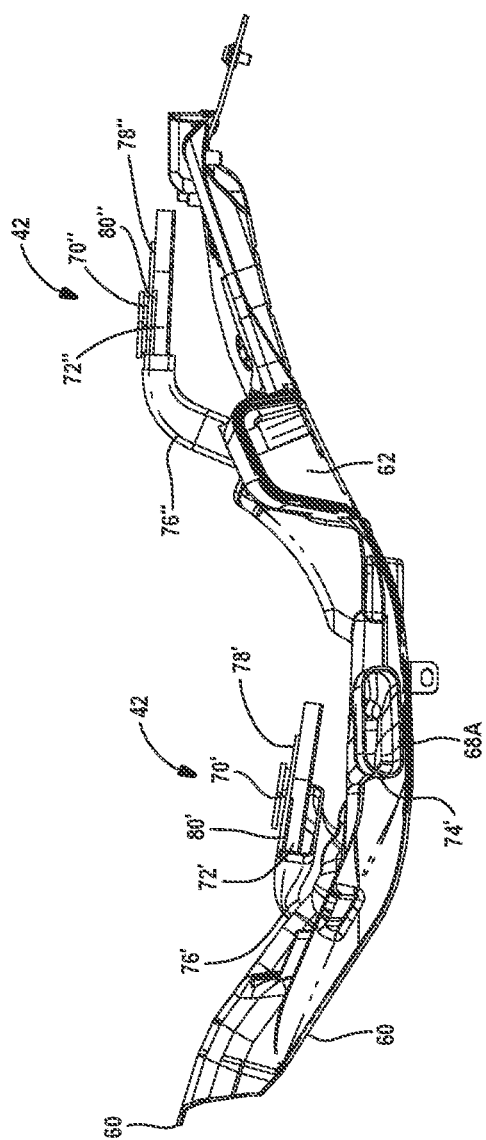
FIG. 6 is a side view of the seat pan having a passenger heating and cooling module and a driver heating and cooling module.

Referring now to FIGS. 6-8, a driver heating and cooling module 70' is illustrated in the driver position 42, while a passenger heating and cooling module 70" is illustrated in the passenger position 44. Each of the heating and cooling modules 70' and 70" may be configured in a similar manner to that set forth above with respect to the heating and cooling module 70 illustrated in FIGS. 5A-C. The heating and cooling modules 70' and 70" may operate in a similar way and may be independently controlled. Discrete switches or a controller area network (CAN) may be used for controlling the heating and cooling modules 70' and 70". Because of geometric limitations, the inlet air duct 74 and the outlet air duct 76, illustrated in FIGS. 5A-C, may be configured in different shapes for the heating and cooling modules 70' and 70". The same reference numerals are used as in FIGS. 5A-C except the use of a prime for the driver position and a double prime for the passenger position.

A driver heating and cooling module 70' is illustrated having the inlet air duct 74' extends in a lateral direction and may align with the port 68A in the seat pan 60 and port 50 in the seat cover illustrated in FIG. 3A. The port 50, as mentioned above, may be located on the cool side of the vehicle 10 on the opposite side as the exhaust pipe 26. This allows cooler air to be drawn in from the action caused by the fan 72'. In this example, the outlet air duct 76' is coupled to the seat pan 60. That is, the outlet air duct 76' may be coupled to exhaust air out of outlet port 68C in the seat pan 60. In various examples, the heating and cooling module 70' may "float" within the cover support 56 or may be fixably mounted to the seat pan 60.

The passenger heating and cooling module 70" has an inlet air duct 74" aligned with the port 68B and an outlet air duct 76" aligned with the outlet port 68D. Of course various orientations and positions of inlet and outlet ports may be configured.

Figure 7A:
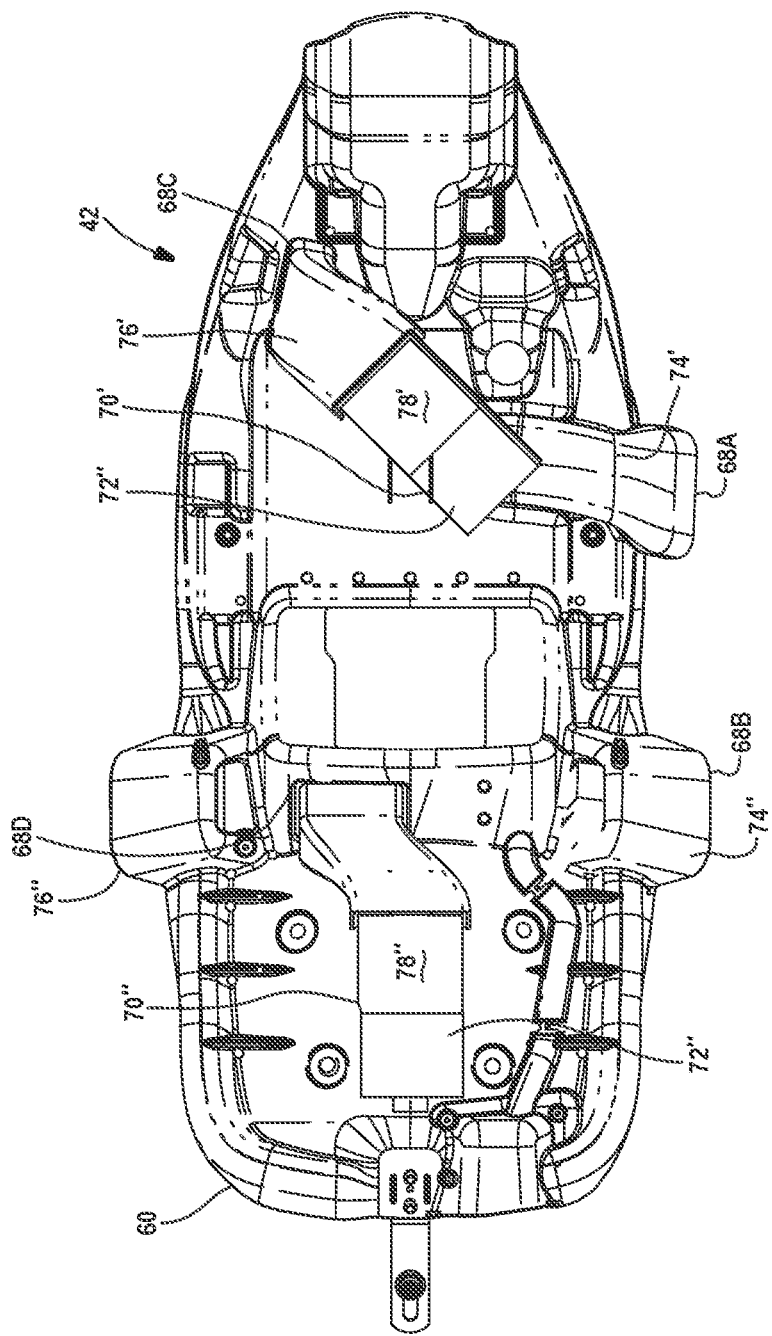
FIG. 7A is a top view of the seat pan having a passenger heating and cooling module and a driver heating and cooling module.
Figure 7B:
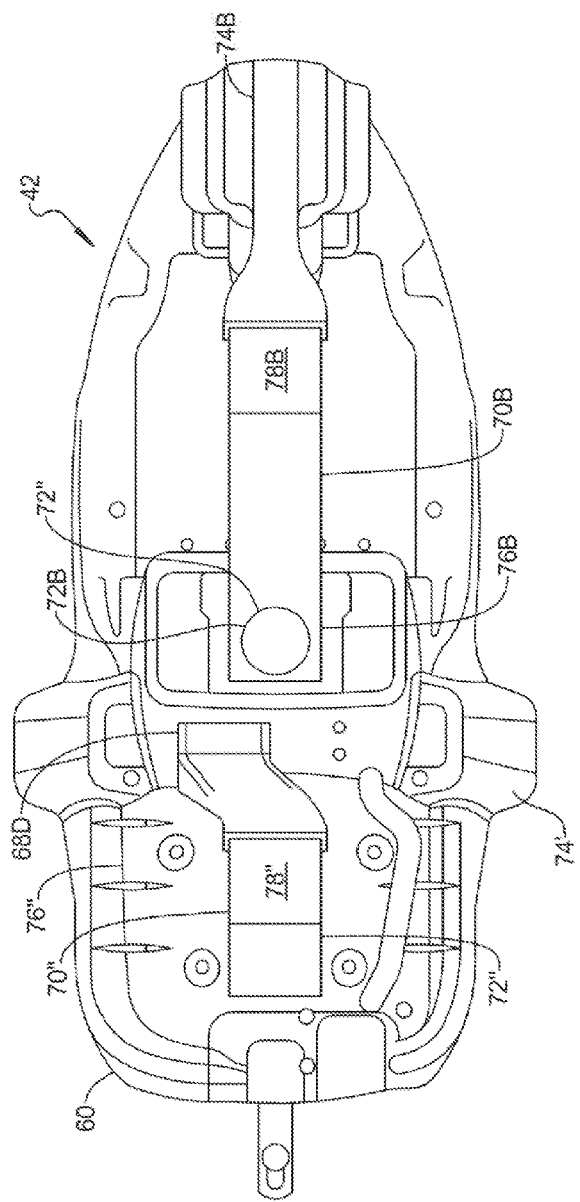
FIG. 7B is a first alternate top view of the seat pan having a passenger heating and cooling module and a driver heating and cooling module.

Referring now to FIG. 7B, an alternate orientation duct associated with the heating and cooling module 70B is set forth. In this example, the heating and cooling module 70B has a heat exchanger 78B. In this example, the inlet duct 74B provides inlet air to the heat exchanger 78B, the outlet duct 76B removes air from the heat exchanger 78B. A fan 72B moves the air through the inlet duct 74B and the outlet duct 76B. In this example, the inlet duct 74B and the outlet duct 76B are longitudinally disposed. In this example, the inlet duct 74B and the outlet duct 76B are in the middle of the seat pan 60. In the example set forth in FIG. 7B, the longitudinal axis of the seat corresponds to the longitudinal axis of the inlet duct 74B and the outlet duct 76B.

Figure 7C:
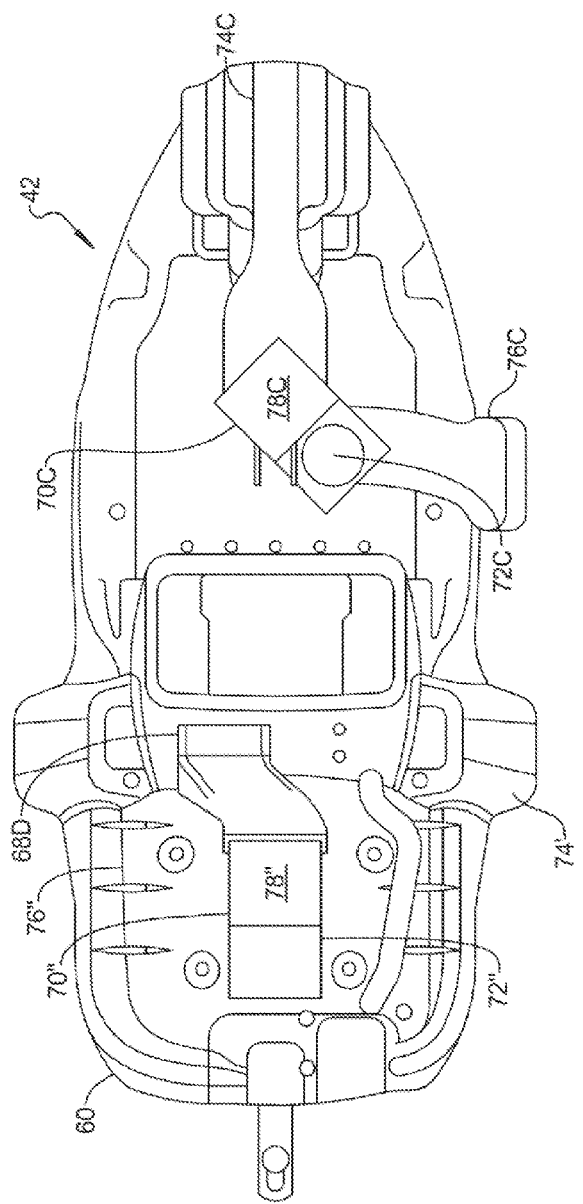
FIG. 7C is a second alternate top view of the seat pan having a passenger heating and cooling module and a driver heating and cooling module.

Referring now to FIG. 7C, the inlet duct 74C is positioned in a similar manner to that set forth in FIG. 7B. In this example, however, the outlet duct 76C is positioned toward a lateral side of the seat pan 60. A fan 72C may be disposed in the outlet duct 76C to pull air through the heating and cooling module 70C, through the inlet duct 74C and past the heat exchanger 78C. In this example, the inlet duct 74C is aligned with the longitudinal axis of the seat pan 60. The outlet air duct 76C may be perpendicular to or at a slight angle to the perpendicular of the inlet duct 74C. The outlet duct 76C may be disposed on the hot side of the vehicle.

Figure 7D:
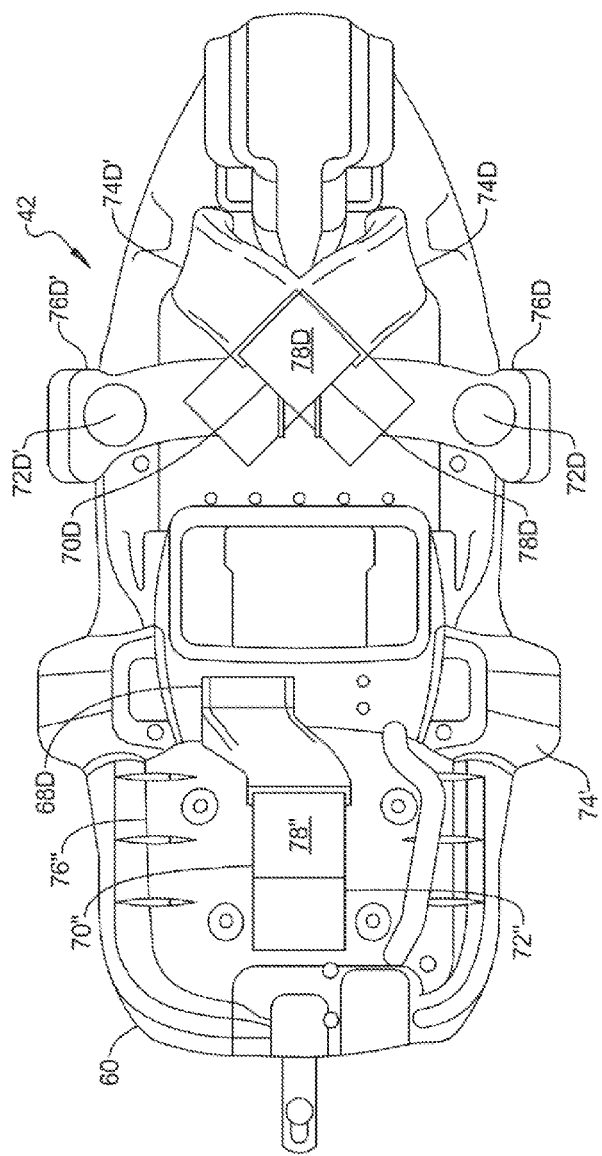
FIG. 7D is a third alternate top view of the seat pan having a passenger heating and cooling module and a driver heating and cooling module.

Referring now to FIG. 7D, the inlet duct may be formed from two inlet ducts 74D and 74D'. In this example, the inlet to the seat ducts are disposed on each side of the seat pan. The inlet ducts 74D and 74D' are disposed at about a 45° angle to the longitudinal axis of the seat pan 60. Although about a 45° is formed with the longitudinal axis and the inlet ducts 74D, 74D', various angles may be set forth.

In the example set forth in FIG. 7D, the outlet duct may be replaced by a pair of outlet ducts 76D and 76D'. Each outlet duct 76D, 76D', has a corresponding fan 72D and 72D'. The fans 72D and 72D' pull air through the inlet ducts 74D, 74D' through the heating and cooling module 70D and across a heat exchange 78D. Although not shown in this example, a pair of heat exchangers may also be used rather than a single heat exchanger. If a pair of heat exchangers are used, they may disposed in each of the outlet ducts 76D, 76D'.

Referring now to FIG. 7E, a pair of inlet ducts 74E and 74E' are configured in a similar manner to that set forth in FIG. 7D. In this example, however, the outlet duct 76E is a singular outlet duct configured in a similar manner to that set forth in FIG. 7B. That is, the outlet duct 76E is disposed in a longitudinal manner extending from the heat exchanger 78E. A fan 72E is disposed in the outlet duct 78E. The outlet duct 76E may exhaust air beneath the seat pan 60.

Figure 7F:
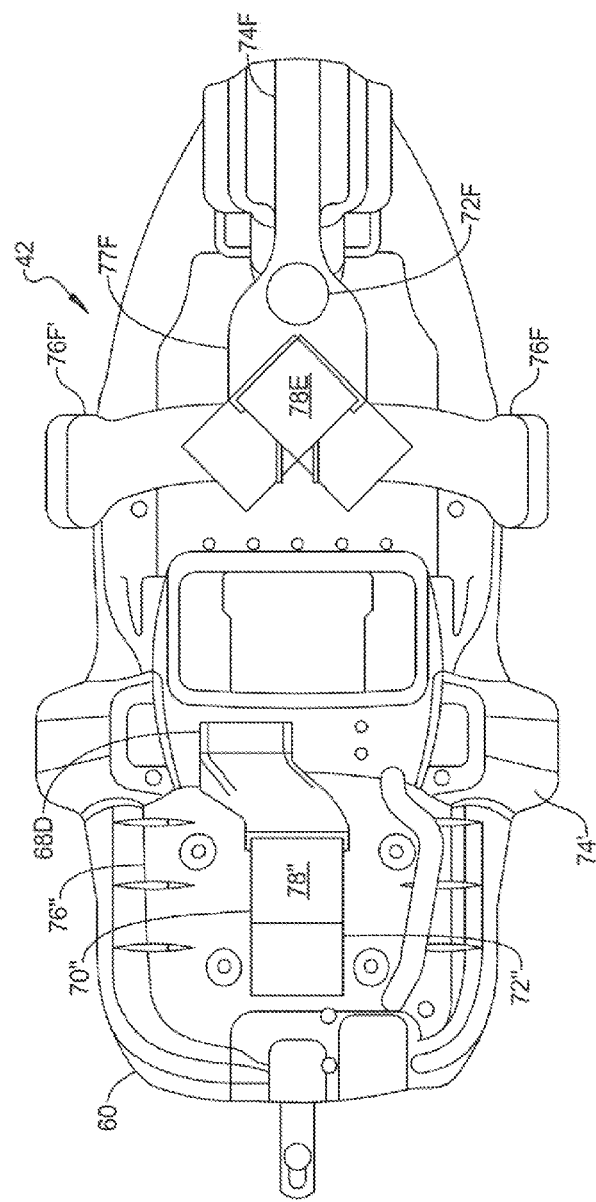
FIG. 7F is a fifth alternate top view of the seat pan having a passenger heating and cooling module and a driver heating and cooling module.

Referring now to FIG. 7F, a longitudinally disposed inlet duct 74F having a fan 72F disposed therein may draw air into the inlet duct 74F and provide outlet air through the outlet duct 76F and 76F'. The heat exchanger 78F may be in fluid communication with the inlet duct 74F and the outlet ducts 76F and 76F'. The outlet ducts 76F and 76F' are disposed at an angle relative to the longitudinal axis of the seat pan 60.

As flared portion 77F is provided at the heat exchanger end of the inlet duct 74F to widen out the inlet duct connector to the heat exchanger 78F.

Referring now to FIG. 7G, the inlet duct is formed from a pair of inlet ducts 74G, 74G' in a similar manner to that set forth in FIG. 7E. The inlet ducts are in communication with the heat exchanger 78G. The outlet duct 76G extends from the heat exchanger 78G and forms a t-shape having a longitudinally extending portion G' that may coincide with the longitudinal axis of the seat pan 60. In this example, the portion 76G' includes the fan 72G. The portions 76G" and 76'" extend perpendicularly from the base portion 76G' and extend to each side of the seat pan 60.

Figure 7H:
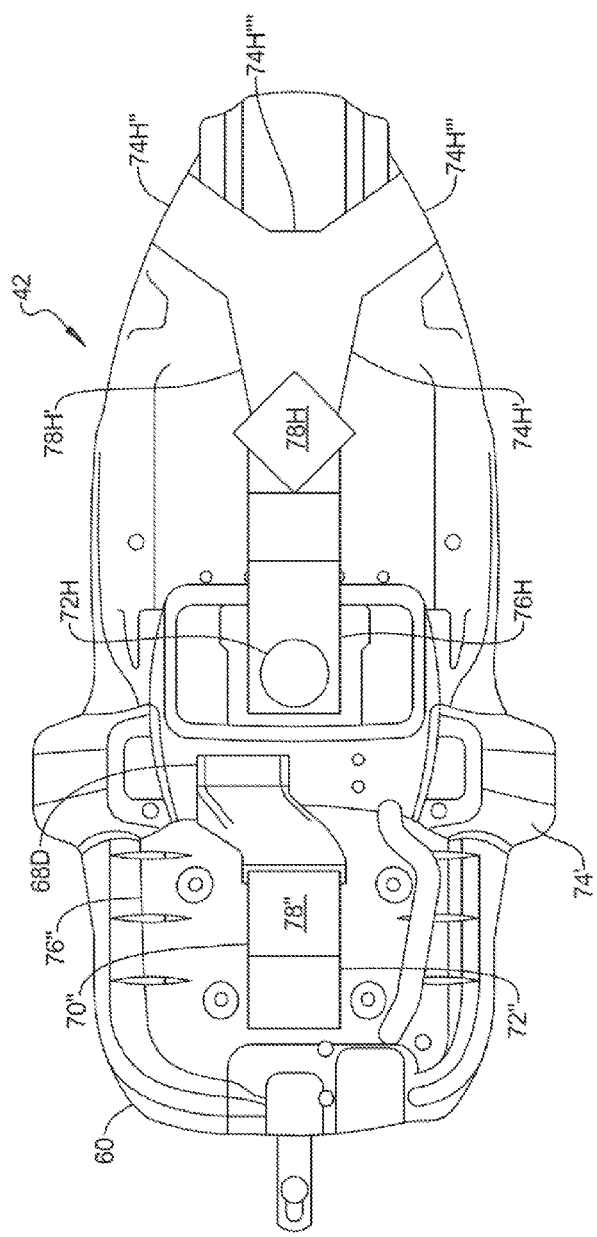
FIG. 7H is a seventh alternate top view of the seat pan having a passenger heating and cooling module and a driver heating and cooling module.

Referring now to FIG. 7H, the inlet duct 74H may be formed of a longitudinally extending portion 74H' that is generally conical in the longitudinal direction so that the wider portion is toward the front of the seat pan. The longitudinally extending portion 74H' includes two angularly disposed portions 74H" and 74H'" that extend to an angular direction relative to the longitudinal axis of the seat pan 60 and extend to either side of the seat pan 60. A flat portion 74H"" may connect the inlet duct 74" and the inlet duct 74".

The outlet duct 76H may be formed with a fan 72H therein. The duct 76H may be formed in a similar manner to that set forth in FIG. 7B. That is, the outlet duct 76H may be coincident with the longitudinal axis of the seat pan 60.

Referring now to FIGS. 9A-9F, the heating and cooling module 70 and the ducts 74, 76 associated therewith illustrated in FIG. 5A-C may be disposed in various positions within the seat assembly 40. The heating and cooling module 70 may be located in the driver or passenger position. The configuration of the inlet air duct 74 and the outlet air duct 76 may be located in various positions (or even eliminated) depending upon the configuration of the vehicle and the heating characteristics of the vehicle.

Figure 9A:
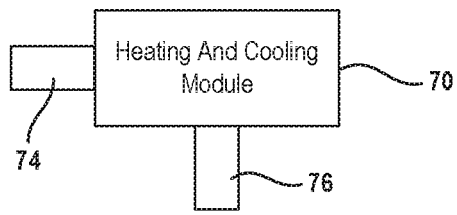
FIGS. 9A-9F are block diagrammatic views of a heating and cooling module having different positions for inlet air ducts and outlet air ducts.

FIG. 9A corresponds to a configuration having the inlet air duct 74 extending in a lateral position such as that illustrated in FIG. 6. The lateral position, as mentioned above, may be on the cooled side of the vehicle. The outlet air duct 76 may be directed in a vertically downward direction relative to the vehicle 10.

Figure 9B:
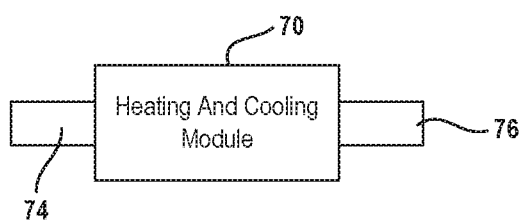

In FIG. 9B, the inlet air duct 74 is located in the same position as in FIG. 9A. However, the outlet air duct 76 is disposed in a lateral direction on the opposite side of the seat. The outlet air duct 76, in a motorcycle type vehicle, may be directed to the heated side of the vehicle 10.

Figure 9C:
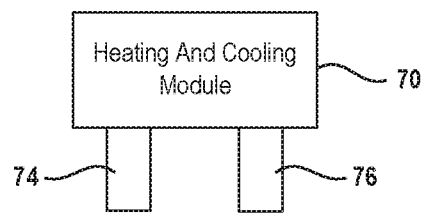

In FIG. 9C, the inlet air duct 74 and the outlet air duct 76 are directed beneath the seat assembly 40. The inlet air duct 74 and the outlet air duct 76 may be separated by the structure of the seat pan 60 or vehicle 10 so that outlet air is not drawn into the inlet air duct 74.

Figure 9D:
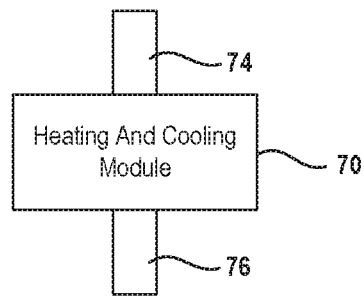

In FIG. 9D, heating and cooling module 70 may have the inlet air duct 74 disposed to draw air from above the seat and exhaust the air through the outlet air duct 76 below the seat.

Figure 9E:
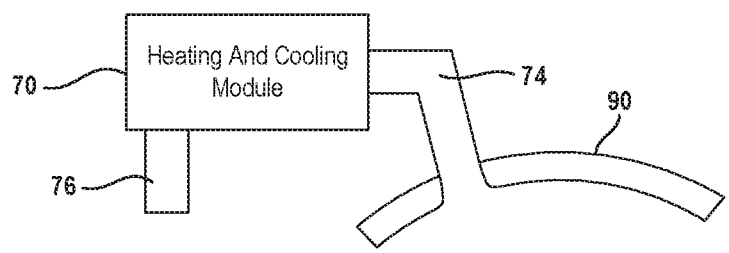

Referring now to FIG. 9E, the vehicle 10 may include a fender 90 having the inlet air duct 74 coupled thereto. The air within the fender 90 is relatively cool and thus the inlet air duct 74 draws in cooler air than may be around the vehicle engine. The outlet air duct 76 is directed beneath the seat.

Figure 9F:
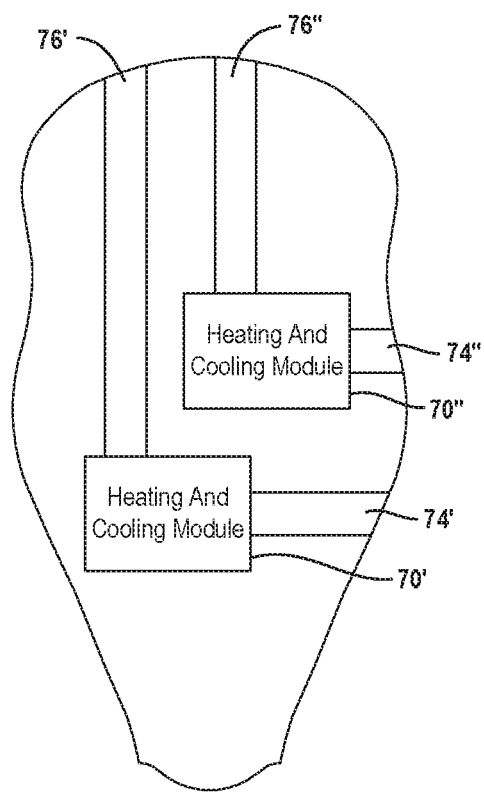

Referring now to FIG. 9F, a top view of a vehicle seat assembly 40 is set forth having the driver heating and cooling module 70' and the passenger heating and cooling module 70". In this example, the inlet air ducts 74', 74" are receiving air through the cooled side of the vehicle. The outlet air ducts 76', 76" are directed rearward and exhaust air through the rear portion of the seat. The rear portion of the seat may be the back side of the seat cover of at the rear portion of the seat pan.

Figure 10A:
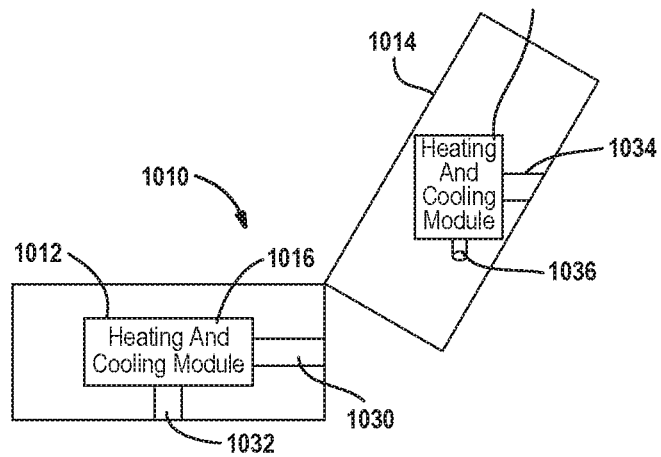
FIG. 10A is a side view of a two-part seat having heating and cooling modules in a seat back and a seat base.

Referring now to FIG. 10A, a seat 1010 is illustrated having a seat base 1012 and a seat back 1014. In this example, a heating and cooling module 1016 is located in the seat base 1012. A heating and cooling module 1018 is located in the seat back 1014. The configuration set forth in in FIG. 10A may be for a single passenger vehicle or may be for a side-by-side vehicle, as described below in FIG. 10B. Base heating and cooling module 1016 may include air ducts 1030 and 1032. Heating and cooling module 1018 may include air ducts 1034 and 1036. The air ducts 1030 and 1032 may be either inlet air ducts or outlet air ducts. That is, depending on the vehicle configuration or vehicle use, inlet and outlet may be desired from different positions within the vehicle. For example, air duct 1032 may be directed to the side of the seat base 1012. Exhaust air may be directed through the air duct 1030. However, air duct 1030 may also be an inlet air duct and air duct 1032 may represent an outlet air duct directed to the bottom of the seat base 1012. Likewise, air ducts 1034 and 1036 may be inlet or outlet air ducts. Air duct 1034 may be directed to draw air from the rear of the seat back 1014. Outlet air may be directed through the side of the vehicle through the air duct 1036. Likewise, inlet air may be drawn in through a side directed air duct 1036 and exhausted through air duct 1034.

Figure 10B:
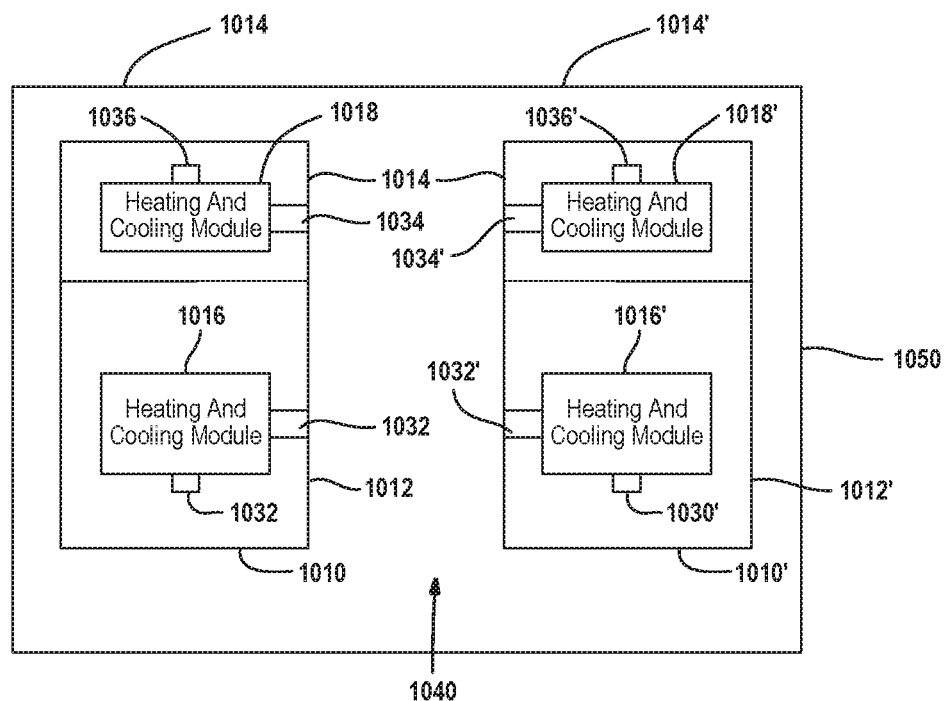
FIG. 10B is a diagrammatic view of the side-by-side vehicle having two seats corresponding to FIG. 10A.

Referring now to FIG. 10B, a representation of a side-by-side vehicle 1050 is illustrated. Two seats formed according to FIG. 10A are set forth. The air ducts 1032, 1032', 1034 and 1034' are directed to the space 1040 between the seats 1010 and 1010'. This may be especially desirable for muddy or dirty conditions. That is, the air ducts 1032 and 1032' are directed to the space 1040 between the seat base 1012 and the seat base 1012'. The air ducts 1034 and 1034' for inlet air to the heating and cooling modules 1018 and 1018' are directed to the space 1040 between the seat backs 1014 and 1014'. The air ducts 1030 and 1030' may be directed beneath the seats and, in particular, beneath the seat bases 1012, 1012', respectively. The air ducts 1036 and 1036' may be directed to the rear or below the seats.

Figure 11:
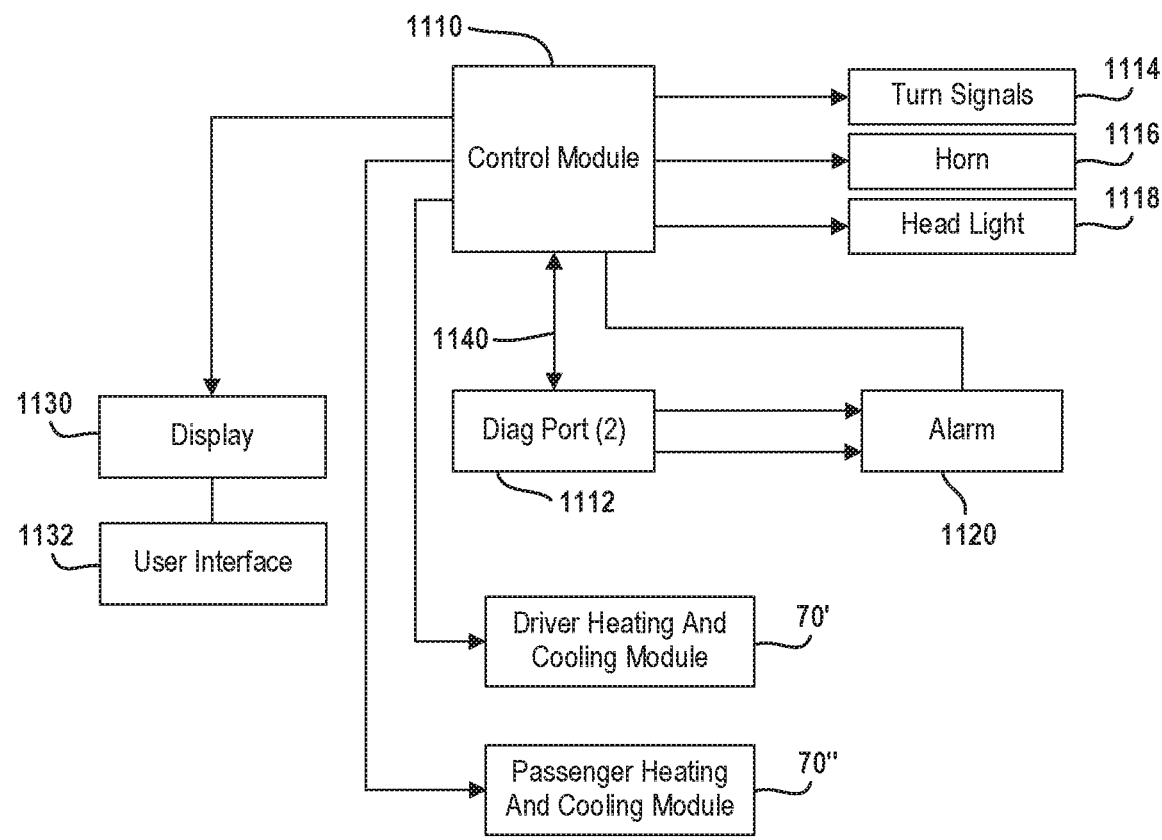
FIG. 11 is a block diagrammatic view of control system of a vehicle.

Referring now to FIG. 11, a control module 1110 is illustrated relative to various components of the vehicle. The control module 1110 may be in communication with various components such as turn signals 1114, a horn 1116 and a headlight 1118. The control module 1110 may also be in communication with a diagnostic port 1112 used for diagnostics of various components such as the engine. The control module 1110 may also control various engine functions. An alarm module 1120 may also be in communication with the control module 1110 to prevent theft of the vehicle. Of course, the functions performed by the control module 1110 may be performed by one or several microprocessors.

A display 1130 may be in communication with the control module 1110 for displaying various types of information or providing various controls. If the display 1130 is a touch screen, a user interface 1132 may be implemented as touch screen buttons displayed on the user interface 1132. The user interface 1132 may also be comprised of a plurality of discrete buttons located directly adjacent to the display 1130. The user interface 1132 may be used for inputting various key signals for performing various functions such as activating the heated and cooled seats and providing settings therefor. The control module 1110 may be in communication with the driver heating and cooling module 70' and the passenger heating and cooling module 70". Of course, the passenger heating and cooling module may be controlled through a seat-mounted bezel and is described in more detail below.

A controller area network 1140 may be used to intercommunicate between various components such as the display 1130, the control module 1110 and the heating and cooling modules 70', 70".

Figure 12:
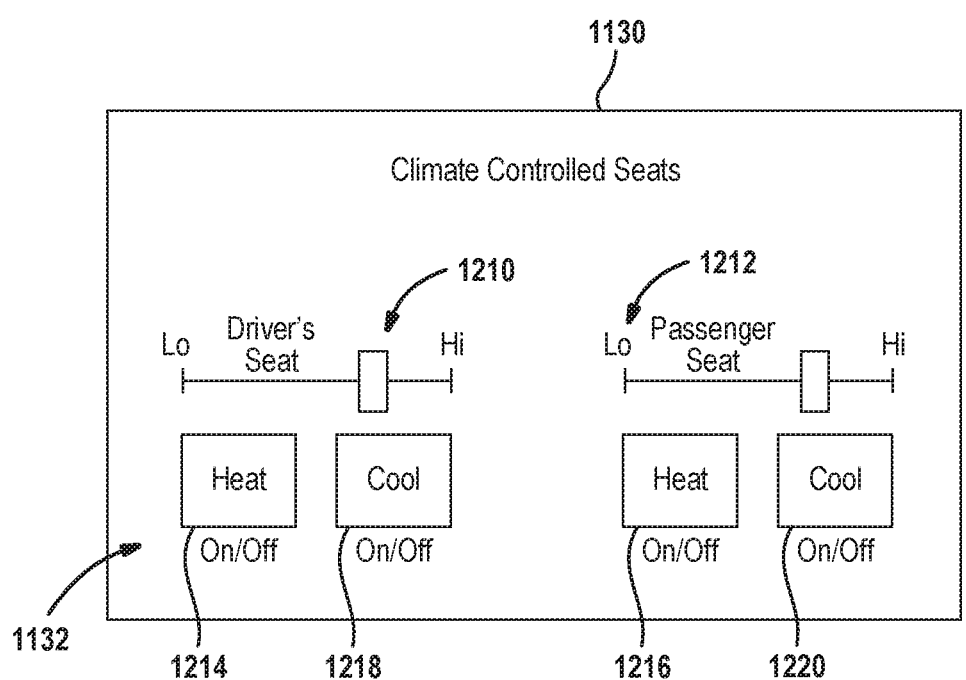
FIG. 12 is a diagrammatic view of a screen interface.

Referring now to FIG. 12, the display 1130 of FIG. 11 is illustrated in further detail. In this example, the display 1130 is a touch screen display that provides the user interface 1132. The user interface 1132 is used to provide signals from the touch screen for activating the heated and cooled seats for both the driver seat and passenger seat. However, the passenger seat control may be eliminated as the passenger seat may be controlled by a separate switch. In this example, a slide bar 1210 is used for providing an input for higher or lower activation of the heated and cooled seat. The passenger seat slide bar 1212 is also configured in a similar manner. The activation of the heated seats is performed using the user interface button 1214 for the driver seat or 1216 in the case of the passenger seat. Activation of the cooled seat is activated using the user interface button 1218 for the driver seat and 1220 for the passenger seat. The signals from the user interface buttons 1214-1220 and the slide bar 1210 and 1212 may be communicated through the controller area network 1140 of FIG. 11.

Figure 13A:
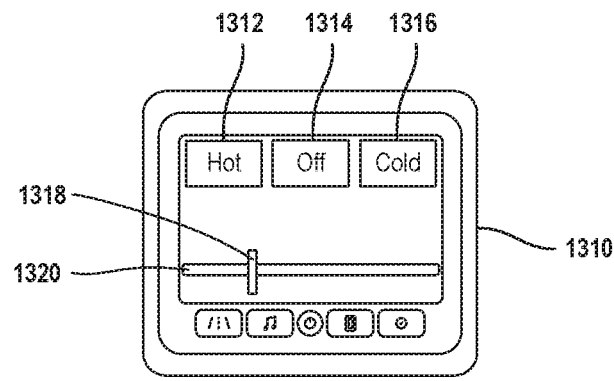
FIG. 13A is a diagrammatic view of a first switching apparatus for controlling the seat.
Figure 13B:
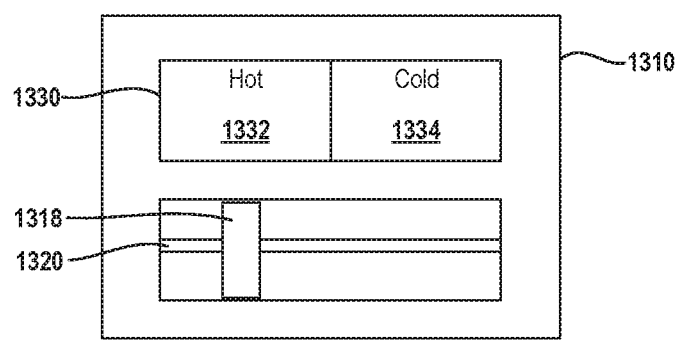
FIG. 13B is a diagrammatic view of a first alternate switching apparatus for controlling the seat.

Referring now to FIGS. 13A and 13B, a bezel 1310 is illustrated for housing discrete switches that may be used for either the passenger seat heating and cooling control or the driver seat heating and cooling control. As mentioned above, a bezel opening 62 may be provided in the seat for one or both of the bezels 1310 for control of the driver and passenger seat. Both the driver seat and passenger seat may be independently controlled through the implementation of different bezels. FIG. 13A includes a hot button 1312, a cold button 1314 and an off button 1316 that are pressed to activate the hot, cold or turn off the heated and cooled seats. A slide dial bar 1318 may be split within a track 1320 to control the intensity of the heat or the cooling.

Referring specifically to 13B, a rocker switch 1330 may be implemented having a neutral position for "off." Depressing the hot side 1332 activates the heating aspect of the seat while depressing the cold side 1334 rotates the rocker switch 1330 to activate the cooling aspect of the seat. A slide bar 1318 and track 1320 similar to that of 13A may be used to control the intensity of the heating or cooling as described above.

Figure 13C:
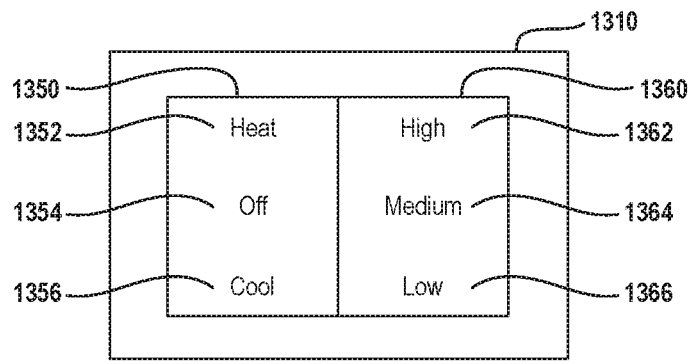
FIG. 13C is a diagrammatic view of a second alternate of the switching apparatus having two three position switches for controlling heating and cooling of the seat.

Referring now to FIG. 13C, the bezel 1310 may include two three position switches 1350, 1360. The switches 1350, 1360 may be toggle switches that have a neutral or middle position (untoggled), an up depressed position and a down depressed position. The switch 1350 in this example includes an upward depressed position 1352 that activates heating of the seat, a neutral position 1354 for off and a downward depressed position 1350 that activates cooling of the seat. The switch 1360 includes an upward depressed position 1362 that activates high for heating or cooling depending on the position of the first switch 1350, a neutral position 1364 that activates a medium level of heating and cooling and a downward depressed position 1366 that activates a low level of heating and cooling. Of course the positions could control different features and intensities.

Figure 14:
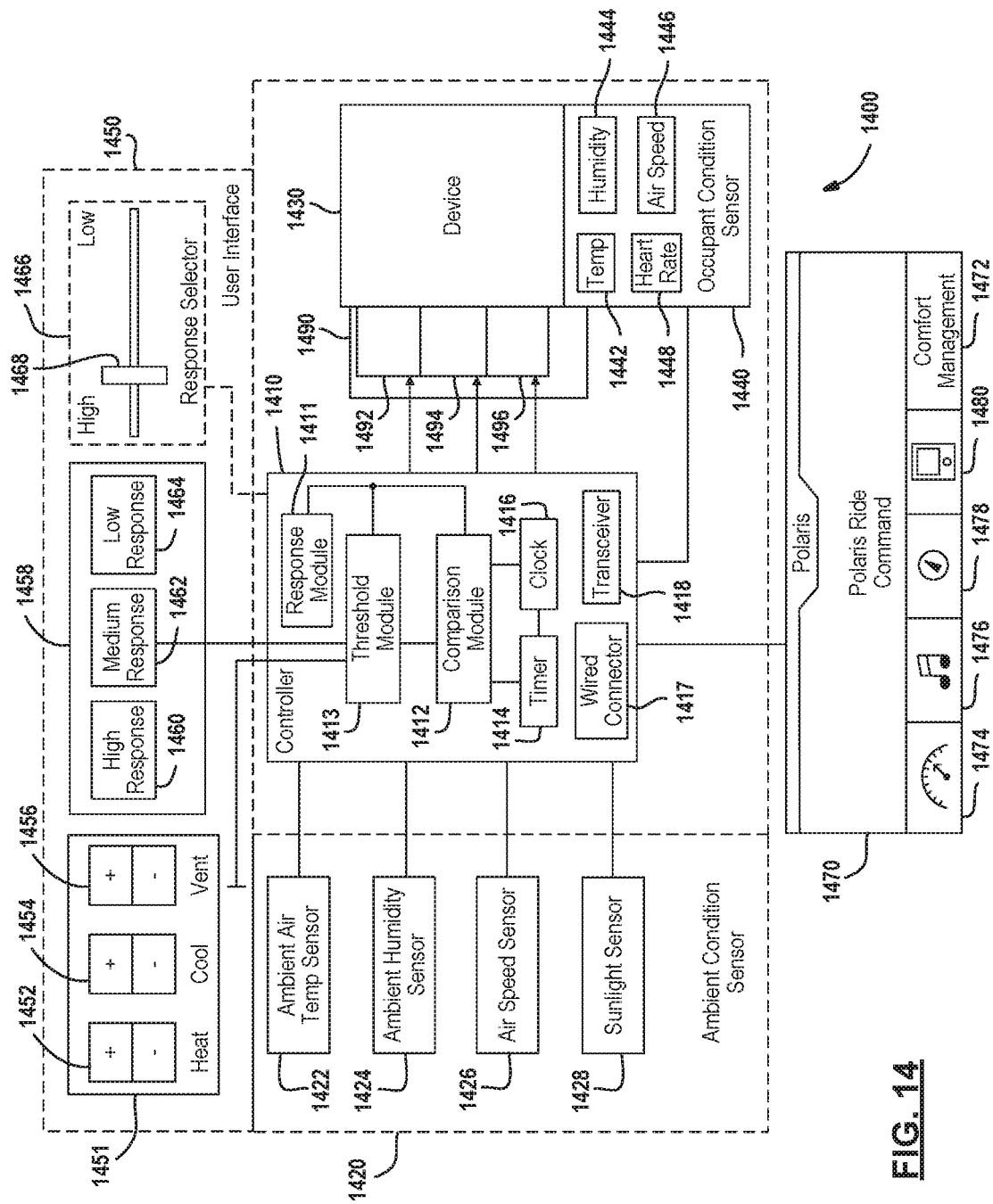
FIG. 14 is a comfort management system for controlling a device.

Referring now to FIG. 14, a comfort management system 1400 may be used for controlling a seat or another device in response to a user input and other inputs such as the ambient conditions in and around the vehicle occupant or occupants or the conditions of the occupants themselves. A controller 1410 may be a microprocessor-based controller that is programmed to perform various functions. In this example, the controller 1410 is in communication with an ambient condition sensor 1420 and a device 1430. An occupant condition sensor 1440 is used to generate an occupant condition signal that has occupant condition data. A user interface 1450 provides a way for a user to provide data for desired settings to be communicated to the controller 1410. The user interface 1450 may also use the various user interfaces set forth in FIGS. 12 and 13A-13C.

The user interface may also be implemented with a touch screen display 1470 that is in communication through the controller area network. The touch screen display 1470, in addition to providing a user interface, may also provide various descriptions and the like for the user. Of course, the display 1470 may be used for other functions such as the radio, navigation, and vehicle conditions.

The ambient condition sensor 1420 may be one or more sensors that are used by the controller 1410 to control various conditions. In this example, an ambient air temperature sensor 1422 generates an ambient air temperature sensor signal that has data corresponding to the ambient air temperature at or within the vehicle. The ambient air temperature sensor 1422 may be located near one or more of the occupants. The ambient humidity sensor 1424 generates an ambient humidity signal that has data corresponding to the ambient humidity. The ambient humidity may be determined around the occupant or around the vehicle. An air speed sensor 1426 generates an air speed signal that has data corresponding to the speed of the air in or around the occupant or vehicle. A sunlight sensor 1428 generates a sunlight signal having data corresponding to an amount of direct sunshine directed to the sensor.

Although one ambient air temperature sensor 1422, one ambient humidity sensor 1424, one air speed sensor 1426 and one sunlight sensor 1428 are illustrated, more than one of the sensors may be provided in a system. For example, more than one vehicle location for an occupant is provided in many vehicles. An ambient condition sensor 1420 may thus be provided at or near one or more of the occupants. The ambient condition 1420 may also be located in various locations of the vehicle. For example, an ambient condition sensor may be located around the lower extremities of an occupant (e.g., the foot well) and another ambient condition sensor may be located toward the head or torso of a vehicle occupant.

The device 1430 may be a seat or another type of device, such as a hand grip, a foot rest, or clothing that the occupant wears as described above.

The occupant condition sensor 1440 generates a signal corresponding to the conditions or adjacent to the occupant. The occupant condition sensor 1440 may be one or more sensors selected from a temperature sensor 1442, a humidity sensor 1444, an air speed sensor 1446, and a heart rate sensor 1448. The temperature sensor 1442 generates a temperature signal having data corresponding to the temperature of the location of the occupant condition sensor. The data from the temperature sensor signal may be used by the controller 1410. The humidity sensor 1444 generates a humidity signal having data corresponding to the humidity at the location of the occupant condition sensor, namely, the position relative to the occupant.

The air speed sensor 1446 generates an air speed signal having data corresponding to the air speed at the occupant. The air speed allows the controller 1410 to compensate for the chilling effects of wind.

The heart rate sensor 1448 generates a signal having data corresponding to the heart rate of the occupant. Increased heart rate may cause the controller to provide lower heating, increase cooling or increase venting.

The occupant condition sensor 1440 may be located in various positions. In a seat, the occupant condition sensor 1440 may be located on or near the seating location. The occupant condition sensor 1440 may also be located in clothing that the occupant is wearing. One or more occupant condition sensors may be provided in an article of clothing. For example, the occupant condition sensor 1440 may be located in a helmet, within a shirt or outerwear, within pants, within sockets or within gloves. Of course, other positions for the occupant condition sensor 1440 may be provided.

The user interface 1450 may provide one or more ways in which to provide user input to the system. A set 1451 of switches 1452, 1454 and 1456 may be used to control various functions. A switch 1452 is used to control the heating. A switch 1454 is used to control the cooling and the switch 1456 is used to control the vent. In this example, the system may control the providing of heat with the switch 1452 and increasing or decreasing the heat. The switch 1454 is used to increase or decrease the amount of cooling. The switch 1456 is used to increase or decrease the vent air. The vent may provide ambient or unconditioned air to the occupant without heating or without cooling.

A response of the heating or cooling module 1490 may be provided with a switch 1458. The response of the system refers to how fast the system reacts or changes based on inputs from the ambient condition sensors. That is, the response refers to the amount or how quickly the system provides heating, cooling or venting in response to the sensed condition from the ambient condition sensor 1420 or the occupant condition sensor 1440. A high response is obtained by selecting the high response button 1460 which provides a quick response from the heating and cooling module 1490. Selecting the medium response button 1462 provides a slower response than the high response button 1460. A low response button 1464 provides a lower response than the medium response button 1462. The difference between the different buttons 1460-1464 may be determined using a timer or the like as will be described below. Thus, a longer delay before the activation of one of the components of the heating and cooling module may be provided.

A slide dial response selector 1466 is another possible type of switch that may be provided. In this example, the slide dial 1468 may be selected by the vehicle occupant to provide the appropriate level of response. The slide dial 1468 has numerous positions and thus different inputs may be provided to the controller 1410 corresponding to a high position, a low position or anywhere in between. The portion of the user interface 1450 described above may be implemented as hard wire switches that are disposed on the vehicle or on the device itself. The user interface 1450 may also be implemented in a touch screen as will be described below.

The touch screen 1470 has various inputs including a comfort management button 1472. The comfort management button 1472 may initiate the activation and feedback for the comfort management system. Of course, other buttons may be provided on the user interface that corresponds to the vehicle conditions at button 1474, the entertainment system 1476, the navigation system 1478, and the mobile device interface 1480. The buttons 1472-1480 may be implemented as hard switches or as touch screen commands.

The controller 1410 includes response module 1411 that receives the desired response from the user interface and provides the signal or a time of delay to a comparison module 1412. A threshold module 1413 provides a threshold used by the comparison module 1412. The threshold module 1413 may receive a threshold from the user interface 1450 or the touch screen 1470. Thresholds may, for example, be determined by direct user input. The threshold module 1413 may, for example, be a desired temperature. The threshold 1413 may also take in consideration the humidity in and around the occupant, the ambient humidity, the air speed in and around the vehicle and the air speed in and around the occupant. The threshold 1413 may be adjusted by the response module 1411. For example, bands around the threshold may be provided that correspond to the desired response, wider bands correspond to lower responses. The system reacts when the bands are crossed rather than the specific temperature setting, for example, not being met. The bands may be set at percentages, five percent, 10 percent, 15 percent, may correspond to high response, medium response and low response, for example. The comparison module 1412 works in conjunction with a timer 1414 and a clock 1416. In another way to implement the response, the timer 1414 may time the change in the conditions and not provide a response until after a time period from the change in condition from the comparison module 1412 indicates a change. After the time period that a higher or lower response by the heating and cooling module 1490 is desired. The comparison module 1412 may thus provide a delay which may be increased or decreased by the occupant. The change of the response of the controller 1410 relative to the heating and cooling module 1490 is advantageous in that when very temporary conditions are experienced such as driving into a tunnel, driving in and out of the sun (wooded area) or other temporary cool or hot areas, the system does not overact.

The controller 1410 may also include a wire connector 1417 and/or a transceiver 1418. The wire connector 1417 communicates with various user interface or the touch screen display 1470 through a hard wire. A wired connector 1417 may also be used to communicate with the occupant condition sensor 1440. A transceiver 1418 may be used to wirelessly communicate with the display 1470, with the user interface 1450, and with the occupant condition sensor 1440. The transceiver transmits and receives data signals to and from the controller 1410.

The heating and cooling module 1490 may include a heater 1492, a cooler 1494 or a vent 1496. The heater 1492 may be implemented in various ways including heating elements used for heating air blowing through a duct. The cooler 1494 may provide cooling air by removing heat from the air within the duct of the system. The vent 1496 provides moving air without heating or cooling the air. The heater 1492 may also be implemented in a resistive wire within the device 1430 that heats. Any of the devices 1492-1496 may be also implemented using conduction provided power.

Figure 15:
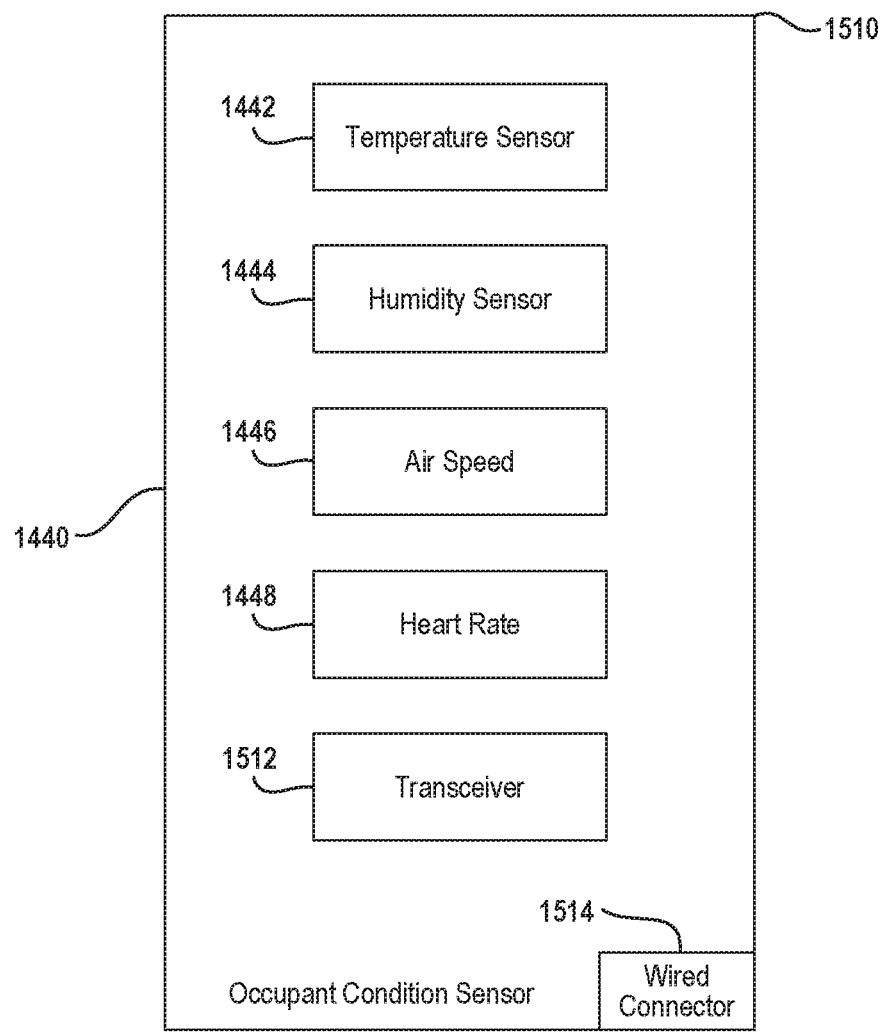
FIG. 15 is a block diagram of an occupant sensor.

Referring now to FIG. 15, the occupant sensor 1440 is illustrated in a housing 1510. The housing 1510 may be located on the vehicle or within clothing of the occupant. For example, the temperature sensor 1442, the humidity sensor 1444, the air speed sensor 1446 and the heart rate sensor 1448 may be located in one housing 1510. Discrete sensors may also be provided. The housing 1510 may be removably coupled to clothing or to the occupant. For clothing, the sensors may be permanently attached on or within the clothing. A transceiver 1512 may be provided within the housing 1510 to communicate wirelessly to and from the controller 1510. More specifically, the transceiver 1512 may communicate with the transceiver 1418 illustrated in FIG. 14. Other examples of mounting the occupant sensors may include in a watch, mobile device or wearable device. Articles of clothing such as a glove, shoe, sock, undergarments, outerwear, base layers and the like.

A wire connector 1514 may also be provided through which a wire may be coupled by wire to the wire connector 1417 illustrated in FIG. 14.

As mentioned above, one or more housings 1510 having one or more of the occupant condition sensors may be provided. If more than one housing 1510 is provided, not all of the sensors 1442-1448 may be provided therein. Also, the housing 1510 may only include a single sensor. Either the temperature sensor 1442, the humidity sensor 1444, the air speed sensor 1446 or the heart rate sensor 1448 may be provided. However, more than one of the sensors may be provided within the housing or individually.

Referring now to FIGS. 16A-16I, a plurality of screen displays for controlling the device, such as the seat, is set forth. The screen displays correspond to ways in which to coordinate device, set various user setting and provide other data to the occupant.

Referring now specifically to FIG. 16A, the comfort management system may have an on button 1610 and an off button 1612 used to turn on and off the comfort management system displaced on the display 1470. The screen display 1608 may be reached after selection of the comfort management button 1472 illustrated in FIG. 14. The on button 1610 turns on the comfort management system and thus allows the user to enter a mode for providing various user settings. The off button 1612 turns the comfort management system off. If multiple devices for control are provided, individual control for the system may be provided.

Referring now to FIG. 16B, a screen display 1620 on the display 1470 may be reached once the comfort management system is turned "on" at the display 1610 above. The screen display 1470 may be used to select various components of the comfort management system to control. In one aspect, a feet button 1622 may be used to adjust the comfort control system, control a feet, a boot or lower extremity system. A hands button 1624 may be used to control the grips or gloves for an occupant. An upper body button 1626 may be used to control the temperature of the upper body or thorax of an occupant. The lower body button 1628 may be used to control the area around the hip section of the occupant. The head button 1630 may be used to control the temperature around the head, helmet or hat associated with an occupant. A seat button 1632 is used to control the heating, cooling, or ventilation of the seat of a vehicle.

Referring now to FIG. 16, a screen display 1640 is illustrated. In this example, a seat control having an up button 1642 and a down button 1644 are set forth. The center display 1646 is used to display a temperature. By selecting the up button, the temperature in the display 1646 changes. The temperature in the display 1646 corresponds to the desired temperature. The button 1644 reduces the temperature in the display 1646. Although a seat control is illustrated in the screen display 1640, a similar interface could be used for various other positions such as those illustrated in FIG. 16B.

Referring now to FIG. 16D, a screen display 1650 is set forth. The screen display 1650 allows manually selecting the heating portion of the heating and cooling module, the cooling portion of the heating and cooling module or the vent portion of the heating and cooling module. To this end, a heating button 1652 allows selection of the heating control of the heating and cooling module 1490. The cooling button 1654 allows the controlling of the cooler portion of the heating and cooling module 1490. Selecting the vent button 1656 allows the control of the vent of the heating and cooling module 1490.

The "auto" button 1658 is used to automatically select the desired operation. For example, the selection of the auto button 1658 will allows the system to change between heating and cooling to seek the desired temperature such the temperature set forth in the display 1646 above. By changing the response of the system described above, the system is prevented from rapidly and inefficiently changing between the heating, cooling and venting operations Referring now to FIG. 16E, the screen display 1660 is illustrated for increasing or decreasing the amount of heating, cooling or venting provided. The screen display 1660 may be generated after the selection of one of the heating, cooling or venting buttons 1652-1656 illustrated in FIG. 16D. In this example, a "minus" button 1662 and a "plus" button 1664 may be provided. Indicator 1666 may be displayed to illustrate the intensity of the amount of heating, cooling and venting provided. The screen display 1660 may display the word "heat" when heating is selected in screen display 1650, may display "cooling" when the cooling button 1654 is selected from the screen display 1650 or "venting" when the selector 1656 is selected in the screen display 1650.

Referring now to FIG. 16F, a screen display 1670 is set forth. The screen display 1670 is used for selecting the response performance of the thermal management system. A fast response selector 1672, a medium response selector 1674 or a slow response selector 1676 may be activated to control the speed at which the heating and cooling module 1490 is commanded to response to the desired temperature. An indicator 1678 may be illuminated corresponding to which selector 1672-1676 have been selected. Other ways of conveying the selection are by highlighting or coloring differently the selectors 1672-1676 of the screen touch display 1470.

Referring now to FIG. 16G, a screen display 1680 is illustrated as an alternate way to control the response performance of the system. In this example, a button 1682 may be moved to the desired response within the box 1684. For example, by touching the screen closer to the "low" side of the box 1684, the button 1682 would be moved to the corresponding location of the touch on the touch screen.

Referring now to FIG. 16H, a screen display 1686 is set forth for displaying a fault status of the system. In this example, an "okay" button 1687 and an "error" button 1688 are used for displaying either an okay status or an error status. The error status may be provided with an indication as to the source of the error or a numerical or alpha numerical code that corresponds to a particular fault. Warnings and instructions may also be provided within or adjacent to the error button 1688.

Referring now to FIG. 16I, a screen display 1690 present a synch screen for synching various systems within the vehicle. In this example, a seat button 1692A, a hand button 1692B, an upper body button 1692C, a lower body button 1692D, a seat button 1692D, and a head button 1692E may be selected to synch the comfort control system with other systems. For example, the feet and hands may be selected so that the temperatures and response performance are the same. By selecting or deselecting, the synchronization of various heating and cooling modules, an improved riding experience is generated. In the screen display 1690, synched systems may have the buttons 1692A-1692E highlighted, colored or otherwise changed to indicated that they have been synched.

Figure 17:
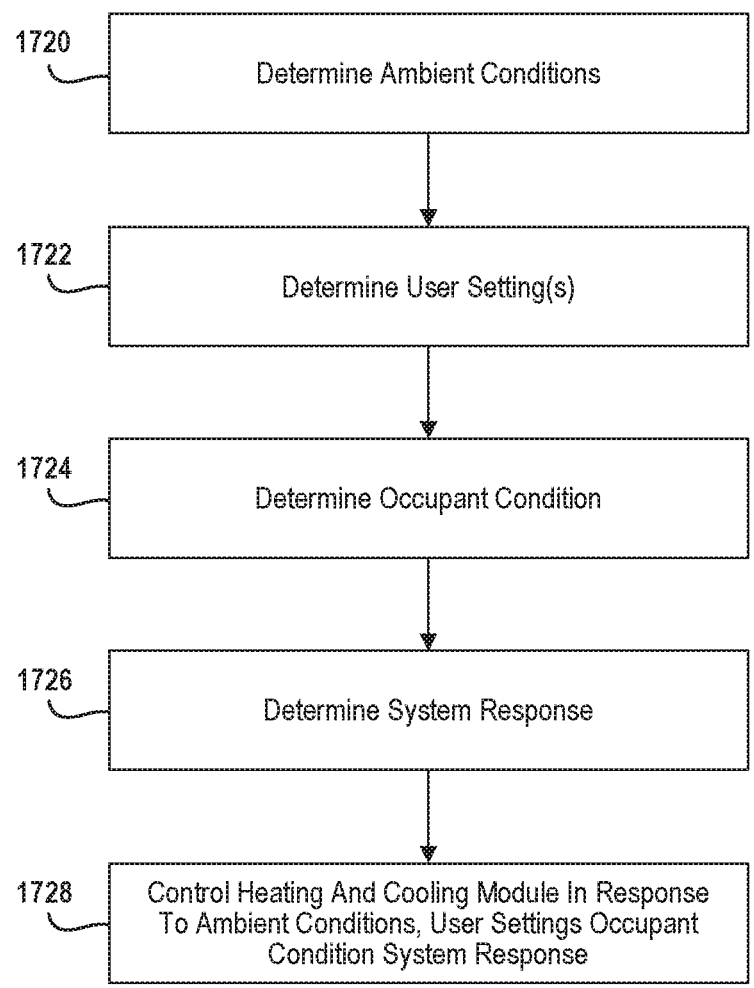
FIG. 17 is a simplified flowchart of a method for operating a comfort control system.

Referring now to FIG. 17, a high level method for controlling the heating and cooling module is set forth. In step 1720, the ambient conditions of the vehicle or around the user are determined. The sensors illustrated in FIG. 14 may be used. In step 1722, the user settings are determined. As mentioned, the user settings may be provided through a user interface generating user setting signals with user data. The user interface may be a discrete switch or a touch screen. The settings may indicated how much heating, cooling or ventilation is desired. The settings may also indicate a desired temperature or humidity. In step 1724, the occupant conditions are determined. This is an optional set if the occupant conditions are to be taken into account for controlling the heating and cooling module. The occupant conditions may be determined from sensors provided within or on clothing such as boots or shoes, pants, jackets, shirts, helmets or the like.

In step 1726, the desired response of the system is determined by the user settings. As mentioned above, the response of the system corresponds to how quickly the occupant would like the system to change in order to try to meet the desired or target temperature or humidity. For example, when the user would not like to feel humidity (sweaty), the venting system or cooling system may be increased to drive the user.

In step 1728, the heating and controlling module is controlled in response to the ambient conditions, the user settings, the occupant conditions and the system response. With respect to temperature, if the temperature is not high enough, heating is provided. If the temperature is too high, heating may be turned off. Likewise, should excess moisture be detected, ventilation or cooling may be provided. Also, as the ambient temperature changes, the amount of heating and the amount of cooling may be increased or decreased to maintain the occupant at a desired level of comfort.

Figure 18:
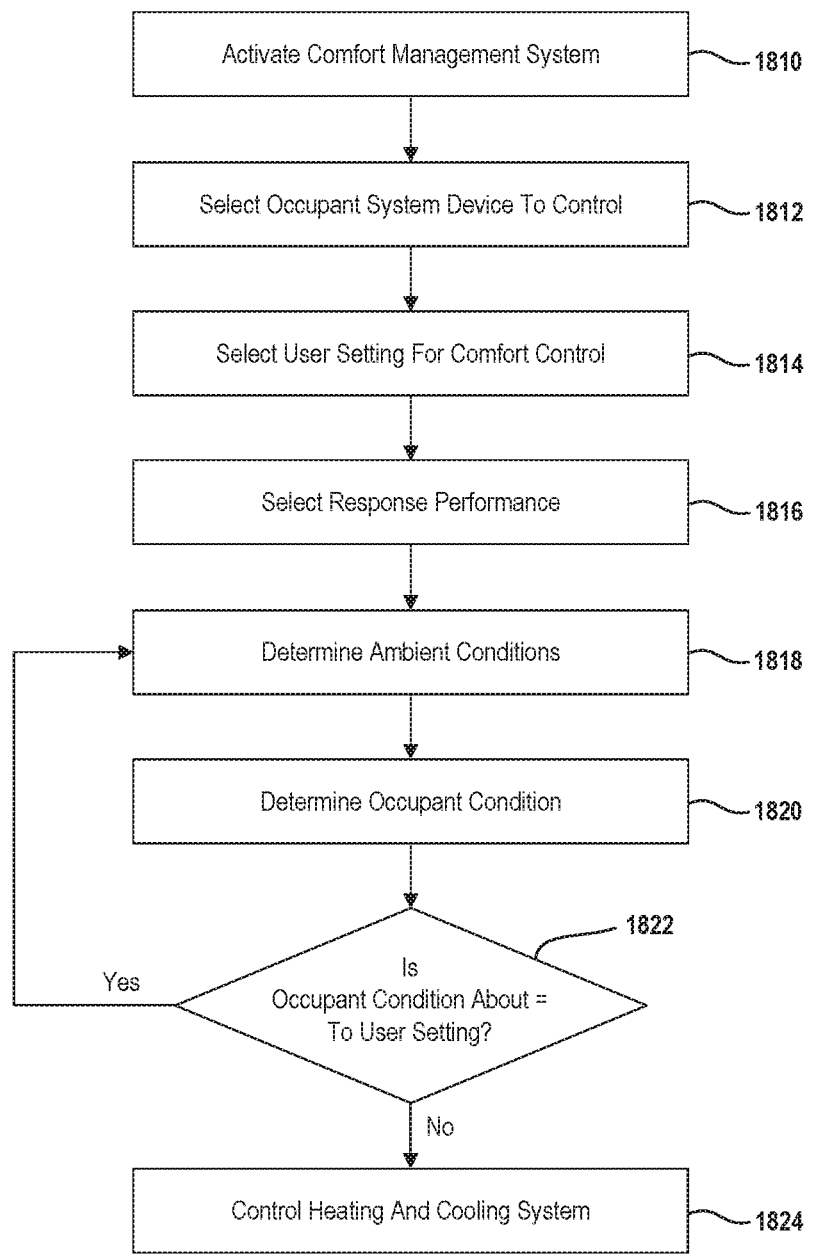
FIG. 18 is a detailed flowchart of a method for operating the comfort management system.

Referring now to FIG. 18, the overall operation of the system is set forth. In step 1810, the comfort management system is activated. As mentioned above, this may take place using discrete switches or a touch screen such as in the Polaris® Ride Command® System. In step 1812, the occupant system to control is selected. In some vehicles, only the seats may be able to be controlled. Therefore, step 1812 need not be performed when only a single comfort system is provided. In step 1814, the user settings are provided for the comfort control system. User settings may, for example, provide a desired temperature. In step 1816, the response performance is also selected by the user. In some systems, a response performance may not be provided. As mentioned above, the response is how quickly the system is controlled to obtain the desired user settings. In step 1818, the ambient conditions around the occupant is determined. These step may be performed for one occupant or may be performed individually for any number of occupants within the vehicle. The ambient conditions may include the temperature, the wind speed, the amount of sunlight and the humidity. When the vehicle is traveling a high rate of speed, for example, the driver may experience "wind chill". The effect is less as the vehicle slows.

Should the occupant have individual occupant condition sensors, the occupant conditions are sensed and provided to the controller. As mentioned above, in certain conditions, the clothing of the occupant may have sensors therein. The sensors provide feedback to the controller so that adequate changes may be made to the heating and cooling module. In step 1822, the occupant condition is compared to the user settings. When the occupant conditions are the same or about the same as the user settings, steps 1818 and 1820 are performed. The word "about" in used in step 1822 to indicate the amount of response. When the temperature, for example, is within a certain range of the desired temperature, a change in the amount of heating or cooling provided by the heating or cooling module may not be adjusted. This is part of the response of the system.

In step 1822, when the occupant condition is not equal to the user setting or outside the range around the user setting, the heating and cooling system is operated to seek the desired user setting in step 1824.

Examples are provided so that this disclosure will be thorough, and will fully convey the scope to those who are skilled in the art. Numerous specific details are set forth such as examples of specific components, devices, and methods, to provide a thorough understanding of examples of the present disclosure. It will be apparent to those skilled in the art that specific details need not be employed, that examples may be embodied in many different forms and that neither should be construed to limit the scope of the disclosure. In some example embodiments, well-known processes, well-known device structures, and well-known technologies are not described in detail.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seat assembly for a vehicle having a longitudinal axis comprising:
   a seat pan;
   a cover support adjacent to the seat pan;
   a seat cover comprising an upper surface and a first longitudinally extending side surface and a second longitudinally extending side surface;
   a heating and cooling module disposed at least partially within the cover support;
   an air inlet in communication with the heating and cooling module, said air inlet communicating air from a port in the seat cover to the heating and cooling module;
   an ambient condition sensor generating an ambient condition signal;
   a user interface generating a user setting corresponding to a comfort condition, said user setting comprising a response performance; and
   a controller coupled to the ambient condition sensor and the heating and cooling module, said controller controlling the heating and cooling module in response to the user setting and the ambient condition signal.

2. The seat assembly as recited in claim 1 wherein the ambient condition sensor comprises an ambient temperature sensor and the ambient condition signal comprises an ambient temperature signal.

3. The seat assembly as recited in claim 1 wherein the ambient condition sensor comprises an ambient humidity sensor and the ambient condition signal comprises an ambient humidity signal.

4. The seat assembly as recited in claim 1 wherein the ambient condition sensor comprises an air speed sensor and the ambient condition signal comprises airspeed.

5. The seat assembly as recited in claim 1 wherein the ambient condition sensor comprises an ambient temperature sensor, an ambient humidity sensor and an airspeed and the ambient condition signal comprises an ambient temperature signal, an ambient humidity signal and an airspeed signal.

6. The seat assembly as recited in claim 1 wherein the ambient condition sensor comprises two selected from an ambient temperature sensor, an ambient humidity sensor and an airspeed and the ambient condition signal comprises two selected from an ambient temperature signal, an ambient humidity signal and an airspeed signal.

7. The seat assembly as recited in claim 1 wherein the user setting comprises a set temperature.

8. The seat assembly as recited in claim 1 further comprising an occupant condition sensor, said controller controlling a heating and cooling module in response to the user setting, the ambient condition signal and the occupant condition sensor.

9. The seat assembly as recited in claim 8 wherein the occupant condition sensor comprises an occupant temperature sensor and the occupant condition signal comprises an occupant temperature signal.

10. The seat assembly as recited in claim 8 wherein the occupant condition sensor comprises an occupant humidity sensor and the occupant condition signal comprises an occupant humidity signal.

11. The seat assembly as recited in claim 8 wherein the occupant condition sensor comprises an occupant temperature sensor, an occupant humidity sensor and an airspeed and the occupant condition signal comprises an occupant temperature signal, an occupant humidity signal and an airspeed signal.

12. The seat assembly as recited in claim 8 wherein the occupant condition sensor comprises two selected from an occupant temperature sensor, an occupant humidity sensor and an airspeed and the occupant condition signal comprises two selected from an occupant temperature signal, an occupant humidity signal and an airspeed signal.

13. The seat assembly as recited in claim 1 wherein the controller controls at least one of a heater of the heating and cooling module, a cooler of the heating and cooling module and a vent of the heating and cooling module.

14. A method of controlling a seat comprising:
generating ambient condition signal from an ambient condition sensor;
generating an occupant condition signal from an occupant condition sensor;
generating a user setting corresponding to a comfort condition at a user interface;
generating a response rate signal from the user interface; and
controlling a heating and cooling module in response to the user setting, the ambient condition signal and the response rate signal.

15. The method of claim 14 wherein generating the ambient condition signal comprises generating an ambient temperature signal and an ambient humidity signal.

16. The method of claim 14 wherein generating the ambient condition signal comprises generating an ambient temperature signal, an ambient humidity signal and an airspeed signal.

17. The method of claim 14 wherein generating the occupant condition signal comprises generating an occupant temperature signal and an occupant humidity signal.

18. The method of claim 14 wherein generating the occupant condition signal comprises generating an occupant temperature signal, an occupant humidity signal and a heart rate signal.

* * * * *